(12) United States Patent
Biryukov et al.

(10) Patent No.: US 11,605,034 B1
(45) Date of Patent: Mar. 14, 2023

(54) METHOD AND SYSTEM FOR ENERGY SAVINGS ESTIMATION RESULTING FROM POWER MANAGEMENT SYSTEM DEPLOYMENT

(71) Applicant: Energy Toolbase Software, Inc., Calgary (CA)

(72) Inventors: Anton Biryukov, Calgary (CA); Prudhvi Tella, Houston, TX (US); Jielian Guo, Katy, TX (US)

(73) Assignee: ENERGY TOOLBASE SOFTWARE, INC., Calgary (CA)

( * ) Notice: Subject to any disclaimer, the term of this patent is extended or adjusted under 35 U.S.C. 154(b) by 13 days.

(21) Appl. No.: 17/073,000

(22) Filed: Oct. 16, 2020

Related U.S. Application Data

(60) Provisional application No. 62/927,509, filed on Oct. 29, 2019.

(51) Int. Cl.
| | |
|---|---|
| G06F 11/30 | (2006.01) |
| G06Q 10/04 | (2023.01) |
| H02J 13/00 | (2006.01) |
| G06Q 50/06 | (2012.01) |
| H02J 3/00 | (2006.01) |

(52) U.S. Cl.
CPC ............ *G06Q 10/04* (2013.01); *G06Q 50/06* (2013.01); *H02J 3/003* (2020.01); *H02J 13/00034* (2020.01)

(58) Field of Classification Search
CPC ..................................................... G06Q 10/04
See application file for complete search history.

(56) References Cited

U.S. PATENT DOCUMENTS

2020/0372588 A1* 11/2020 Shi .................. G06N 5/003

OTHER PUBLICATIONS

"LightGBM: A Highly Efficient Gradient Boosting Decision Tree" Ke, G. et al, 31st Conference on Neural Information Processing Systems (NIPS 2017), Long Beach, CA, U.S.A.
"Which algorithm takes the crown: Light GBM vs XGBOOST?" https://www.analyticsvidhya.com/blog/2017/06/which-algorithm-takes-the-crown-light-gbm-vs-xgboost/.
"Lessons Learned From Benchmarking Fast Machine Learning Algorithms" https://docs.microsoft.com/en-ca/archive/blogs/machinelearning/lessons-learned-benchmarking-fast-machine-learning-algorithms/ Jul. 25, 2017.
"PVLIB: Open Source Photovoltaic Performance Modeling Functions for Matlab and Python", Stein, J. S., et al, Sandia National Lab. (SNL-NM), Albuquerque, NM (United States), May 1, 2016.

* cited by examiner

*Primary Examiner* — Phuong Huynh
(74) *Attorney, Agent, or Firm* — D'Ambrosio & Menon, PLLC; Usha Menon

(57) ABSTRACT

Methods, systems, and techniques for determining the confidence that predicted demand charge savings resulting from deploying an energy management system at a site will match actual cost savings. A processor obtains predicted demand charge savings resulting from deploying the energy management system at the site, and also obtains demand-related data describing at least two of load predictability, load shape, and battery capacity of the energy management system. The processor determines a confidence score representing the confidence that the predicted demand charge savings will result in view of the demand-related data, and displays the confidence score on a display for subsequent use by a user.

21 Claims, 20 Drawing Sheets

| $Load_{(j-1+m)-6, d-7,...,}$ $Load_{(j-1+m)+9, d-7}$ | $Load_{(j-1+m)-1, d-3,}$ $Load_{(j-1+m), d-3}$ | $Load_{(j-1+m)-1, d-2,}$ $Load_{(j-1+m), d-2}$ | $Load_{(j-1+m)-1, d-1,}$ $Load_{(j-1+m), d-1}$ | $Load_{j-96, d,...,}$ $Load_{j-1, d}$ |
|---|---|---|---|---|

FIG. 6A

| $cooling_{(j-1+m)-6, d-7,...,}$ $cooling_{(j-1+m)+9, d-7}$ | $cooling_{(j-1+m)-1, d-3,}$ $cooling_{(j-1+m), d-3}$ | $cooling_{(j-1+m)-1, d-2,}$ $cooling_{(j-1+m), d-2}$ | $cooling_{(j-1+m)-1, d-1,}$ $cooling_{(j-1+m), d-1}$ | $cooling_{j-96, d,...,}$ $cooling_{j-1, d}$ | $cooling\ forecast_{(j-1+m)-6, d,...,}$ $cooling\ forecast_{(j-1+m)+9, d}$ |
|---|---|---|---|---|---|

FIG. 6B

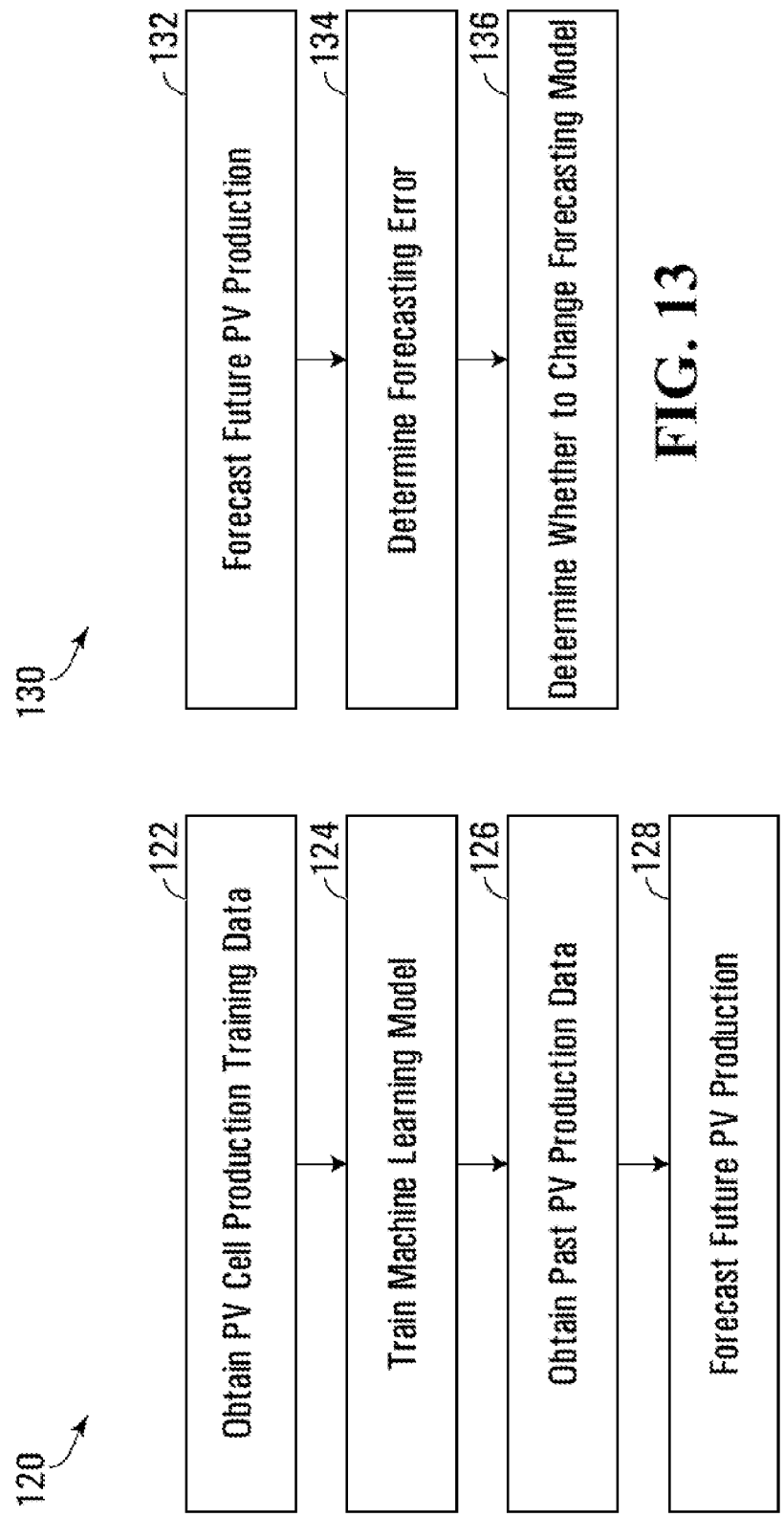

| Configurations | | Annual Electric Bill | Annual Energy Savings | Annual Demand Savings | System Cost | Net Present Value | Internal Rate of Return | Payback Period |
|---|---|---|---|---|---|---|---|---|
| Power Score | Config Name | | | | | | | |
| 43 | 5kW/5kWh Storage + 600kW PV | $264,595 | $2,598 | $1,168 | $1,080,960 | $515,266 | $11.3% | 8.00 yrs |
| 61 | 60kW/60kWh Storage + 600kW PV | $257,731 | $2,577 | $8,073 | $1,080,580 | $686,348 | $13.0% | 7.01 yrs |
| 77 | 60kW/130kWh Storage + 600kW PV | $264,595 | $2,563 | $10,373 | $1,080,580 | $751,912 | $13.6% | 6.52 yrs |
| 71 | 30kW/130kWh Storage + 600kW PV | $264,595 | $2,583 | $6,441 | $1,185,888 | $590,926 | $11.7% | 7.67 yrs |
| 76 | 120kW/260kWh Storage + 600kW PV | $264,595 | $2,500 | $15,834 | $1,308,400 | $774,728 | $12.9% | 6.87 yrs |
| 77 | 120kW/260kWh Storage + 600kW PV | $264,595 | $-50 | $17,105 | $114,200 | $343,560 | $33.8% | 2.89 yrs |
| | Baseline | $264,595 | | | | | | |

METHOD AND SYSTEM FOR ENERGY SAVINGS ESTIMATION RESULTING FROM POWER MANAGEMENT SYSTEM DEPLOYMENT

CROSS-REFERENCE TO RELATED APPLICATION

This application claims priority to United States provisional patent application no. 62/927,509, filed on Oct. 29, 2019, and entitled "Method and System for Energy Savings Estimation resulting from Power Management System Deployment", the entirety of which is hereby incorporated by reference.

TECHNICAL FIELD

The present disclosure relates to methods, systems, and techniques for performing energy savings estimation resulting from deploying a power management system.

BACKGROUND

Commercial and industrial (C&I) sites pay for power differently when compared to residential sites. In particular, C&I sites are generally billed for both their total energy consumption and their peak power demand, referred to as a "demand charge". FIG. 1 shows a typical electricity demand profile of a C&I site, also known as a demand charge profile. The profile comprises a substantially steady-state portion 12 and peaks 14 extending from steady-state portion 12 above a demand threshold 16.

Demand charges exist as a mechanism for utilities to cover the costs of delivering the desired level of energy to customers. Each customer is assigned to a particular "rate tariff" which defines how demand charges are measured and assessed for that customer. While details of rate tariffs can vary from utility to utility, the demand charge is generally based on the maximum energy a site consumed during a time interval (for example 15 minutes or 1 hour) during the previous billing cycle.

While there have been many advances in energy efficiency to enable C&I customers to reduce their energy consumption, until recently there have been few technologies for reducing the demand charge component of a customer's incurred cost. Furthermore, while energy prices have remained low in recent years, demand charges have been on the rise and are expected to continue to rise into at least the near future.

This presents the opportunity to minimize the demand charge component of the customer's incurred cost, referred to as "demand charge management". Not only does demand charge management reduce the customer's electricity bill, but it reduces risks associated with unmanaged peak loads and demand charge price escalation as rate tariffs are updated.

Non-grid electricity supplies, such as energy storage systems, have emerged as a technology which can enable demand charge management through a process known as "peak shaving". The basic process of peak shaving is accomplished by storing (charging) energy in an energy storage system at times of low energy demand, and discharging the stored energy at times of high energy demand.

The process of creating an accurate prediction of a site's future load is difficult and complex, as energy usage patterns can be highly variable from one site to another, and can vary greatly based on numerous factors including the time of day, the day of the week, the day of the year, weather, building type, work schedule, business processes, etc.

Given the complex nature of accurately forecasting future demand of a site, errors in forecasting may lead to insufficient battery capacity being available to deal with sudden and unexpected demand spikes. Given the possibility of forecasting errors leading to unanticipated demand spikes, it would be advantageous if off-grid electricity supply could be better managed in order to deal with unexpected demand spikes Still further, in the context of energy demand management of a site, it is known to predict or forecast the production of photovoltaic (PV) cells at the site. PV cells may be used, for example in conjunction with other energy storage devices such as batteries, to provide non-grid energy for meeting demand spikes. Forecasting the production of PV cells is therefore useful for anticipating how much energy may be available from PV cells at the time a demand spike is anticipated.

Forecasting of PV cell production is known to be accomplished using a forecasting model that relies on knowledge of various physical parameters of the PV cells. While such forecasting may be relatively accurate in the absence of cloud cover, this type of forecasting tends to break down when cloud cover increases. It would therefore be advantageous if an improved method of forecasting PV cell production could be provided.

The present disclosure seeks to provide methods and systems that provide improved management of electricity demand charge, and improved methods and systems for forecasting PV cell production, in view of at least some of the deficiencies encountered in the prior art.

SUMMARY

According to a first aspect, there is provided a method comprising: obtaining, using a processor: predicted demand charge savings resulting from deployment of an energy management system at a site; and demand-related data describing at least two of load predictability, load shape, and battery capacity of the energy management system; determining, using the processor, a confidence score representing a confidence that the predicted demand charge savings will result in view of the demand-related data; and displaying, using the processor, the confidence score on a display.

The confidence score may be determined as a linear combination of the at least two of load predictability, load shape, and battery capacity of an energy management system.

Obtaining the predicted demand charge savings may comprise predicting electricity demand for the site, and predicting the electricity demand may comprise applying a machine learning method.

The machine learning method may comprise a gradient boosted machine learning method. The gradient boosted machine learning method may comprise a gradient tree boosted machine learning method. The gradient tree boosted machine learning method may comprise a light gradient boosted method.

The energy management system may apply support vector regression to predict demand.

Applying the machine learning method may comprise: estimating, using the machine learning method, demand for a first period of time and a second period of time; and interpolating demand for a third period of time that is between the first and second periods of time from the demand for the first period of time and the demand for a second period of time.

Interpolating the demand for the third period of time may comprise determining a weighted average of the demand for the first period of time and the demand for the second period of time. Weights for the weighted average may be based on proximity of the third period of time to the first and second periods of time.

The demand-related data may further describe at least one of weather affecting the site, photovoltaic cell capacity of the energy management system, electricity tariffs affecting the site, and application of electricity at the site.

According to another aspect, there is provided a system comprising: a processor; a display communicatively coupled to the processor; a memory communicatively coupled to the processor and having stored thereon computer program that is executable by a processor and that, when executed by the processor, causes the processor to perform the method of any of the foregoing aspects or suitable combinations thereof.

According to another aspect, there is provided a non-transitory computer readable medium having stored thereon computer program that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Detailed embodiments of the disclosure will now be described in connection with the accompanying drawings of which:

FIGS. 6A and 6B are examples of feature vectors in accordance with embodiments of the disclosure.

FIG. 12 is a flow diagram of a method for forecasting photovoltaic cell production, according to embodiments of the disclosure;

FIG. 13 is a flow diagram of a method for forecasting photovoltaic cell production, according to embodiments of the disclosure;

FIGS. 15A and 15B depicts a user interface page indicating to a user the feasibility of installing a power management system at a site, according to embodiments of the disclosure;

DETAILED DESCRIPTION

Figure 1:
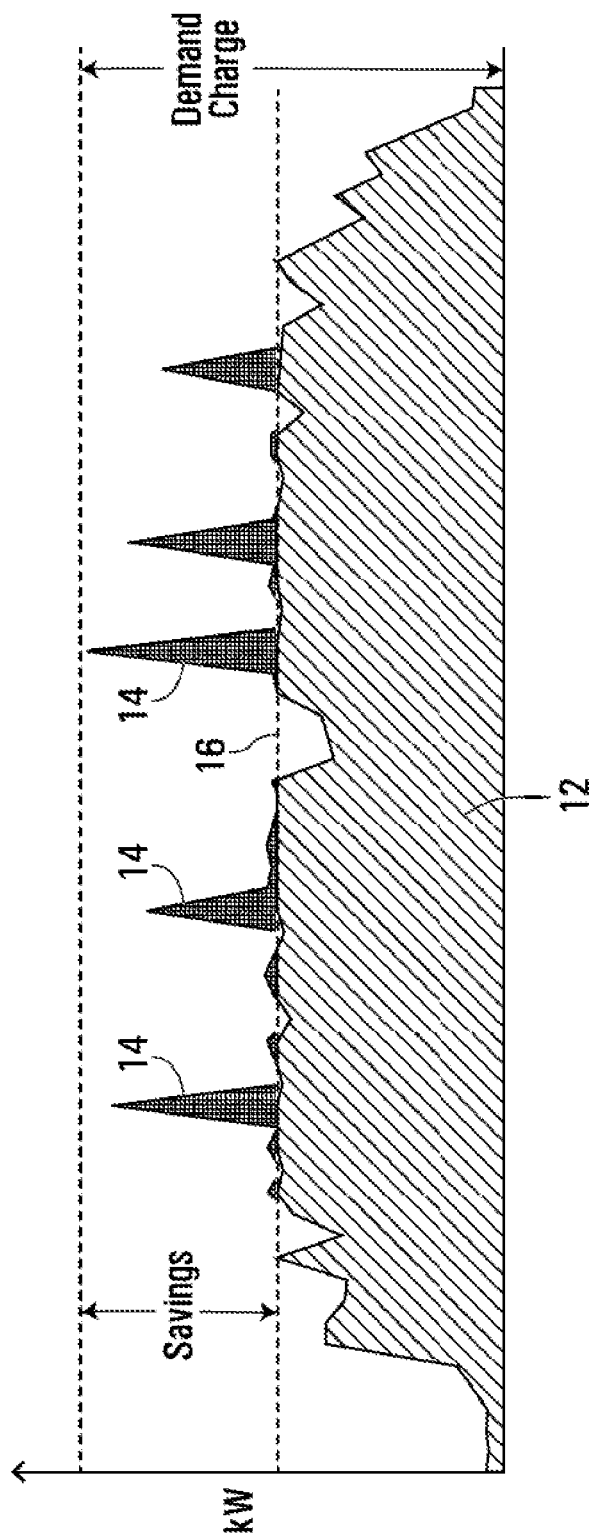
FIG. 1 shows a typical demand charge profile of a commercial/industrial site.

The present disclosure seeks to provide methods and systems for managing electricity demand, and for forecasting production of photovoltaic cells. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the various example embodiments may take the form of a computer program product on a computer-usable storage medium having computer-usable program code embodied in the medium.

Any suitable computer-usable or computer readable medium may be used. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flow diagrams and/or block diagrams of methods, apparatus (systems) and computer program products according to example embodiments. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flow diagram and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flow diagram and/or block diagram block or blocks.

Figure 2:
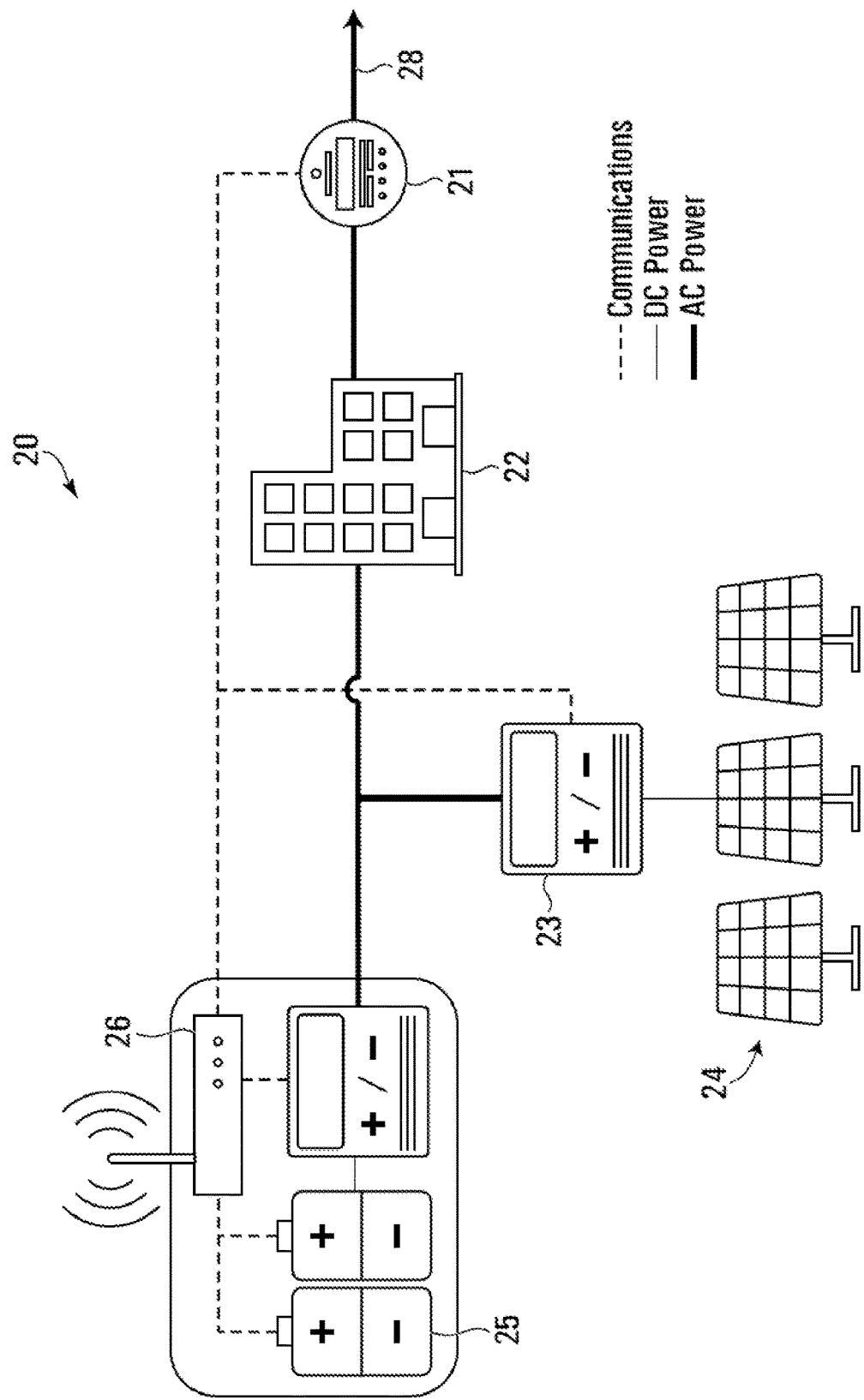
FIG. 2 is a schematic diagram of a power management system in accordance with an embodiment of the disclosure.

With reference to FIG. 2, there is shown a demand management system 20 used for managing electricity demand of a site 22, in accordance with an embodiment of the disclosure. Site 22 is electrically coupled to photovoltaic cells 24 via one or more inverters 23. Site 22 is further electrically coupled to an electricity grid 28 configured to provide electricity on demand to site 22. One or more meters 21 are configured to monitor a consumption of electricity at site 22. Site 22 is further coupled to an energy management system processor 26 (described in further detail below) and batteries 25 configured to provide stored electrical energy to site 22. Batteries 25 are further electrically coupled to photovoltaic cells 24 for recharging of batteries 25.

Figure 3:
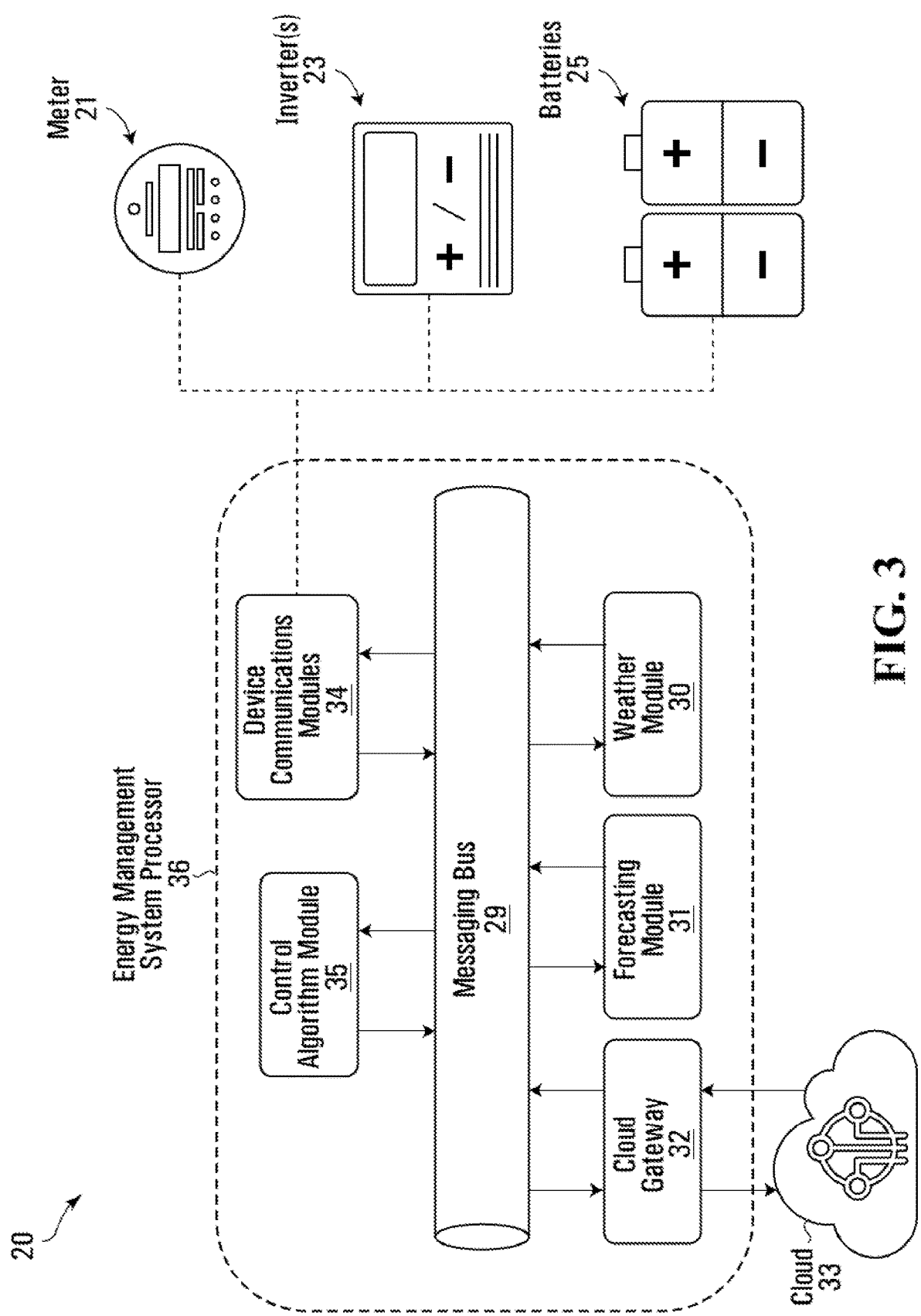
FIG. 3 is a more detailed schematic diagram of the power management system of FIG. 2.

FIG. 3 shows another schematic representation of demand management system 20, this time showing communicative pathways between the various components of demand management system 20. Meters 21, inverters 23, and batteries 25 are communicatively coupled to one or more device communications modules 34 such that data from meters 21, inverters 23, and batteries 25 may be communicated to a messaging bus 29 via device communications modules 34. Also communicatively coupled to messaging bus 29 are a weather module 30 and a forecasting module 31. Energy management system processor 26 is seen to comprise a control algorithm module 35, device communications modules 34, cloud gateway 32, forecasting module 31, weather module 30, and messaging bus 29, although in other embodiments it shall be understood that energy management system processor 26 may comprise more or fewer modules.

Data from weather module 30 and forecasting module 31 may be transmitted along messaging bus 29 to control algorithm module 35. The data transmitted from weather module 30 comprises any weather-related data which may have been forecasted by weather module 30 using methods known to those of skill in the art, or which may have been provided directly to weather module 30 without weather module 30 performing the forecasting of the weather. Control algorithm module 35 comprises one or more processors communicative with memory having computer program code stored thereon. The program code is configured, when executed by the one or more processors, to perform any of the methods described herein. In particular, control algorithm module 35 is configured to implement one or more peak shaving algorithms, as described herein. Control algorithm module 35 may use data received from other components of demand management system 20, such as inverters 23, batteries 25, and forecasting module 31, in order to effectively implement the one or more peak shaving algorithms. Forecasting module 31 contains a machine learning model that is used for forecasting a future load (i.e. projected or expected electricity usage) at site 22, as described in further detail below.

In order to manage the electricity demand at site 22, control algorithm module 35 communicates with forecasting module 31 which is configured to apply a trained machine learning model to a set of past demand data in order to forecast a future load at site 22. The past demand data comprises, amongst other data, past electricity usage data at site 22. As described below, the machine learning model is trained using demand training data which comprises electricity usage training data. The machine learning model may be trained by forecasting module 31 itself or alternatively the trained machine learning model may be downloaded to forecasting module 31, for example via cloud gateway 32 communicating with an external cloud 33. Thus, the machine learning model may be trained externally to demand management system 20, and subsequently obtained by control algorithm module 35 through forecasting module 31.

The machine learning model may be any machine learning model suitable for the purposes described herein. In some embodiments, the machine learning model is a support vector regression (SVR) model. In other embodiments, the machine learning model is a long short-term memory (LSTM) model. Examples of an SVR model and an LSTM model that may be employed by forecasting module 31 are described below.

In a supervised regression problem, the training data is taken as $\{(x_1, y_1), \ldots, (x_l, y_l)\} \subset \aleph \times \Re$, where $\aleph$ denotes the space of the input patterns, for instance $\Re^d$. In $\varepsilon$–SV regression, the goal is to find a function $f(x)$ that has at most $\varepsilon$ deviation from the actually obtained targets $y_i$ for all the training data, and which is at the same time as flat as possible. In the case of a linear function $f$, $$f(x)=\langle \omega, X \rangle + b \text{ with } \omega \in \aleph \ b \in \Re \quad (1),$$

where $\langle . , . \rangle$ denotes the dot product in N. Flatness in (1) implies small $\omega$. In order to achieve flatness, it is required to minimize the Euclidean norm $\|\omega\|^2$. Formally, this can be written as a convex optimization problem by requiring:

$$\text{minimize} \frac{1}{2}\|\omega\|^2 \quad (2)$$

$$\text{subject to} \begin{cases} y_i - \langle \omega, x_i \rangle - b \leq \varepsilon \\ \langle \omega, x_i \rangle + b - y_i \leq \varepsilon \end{cases}.$$

Figure 4:
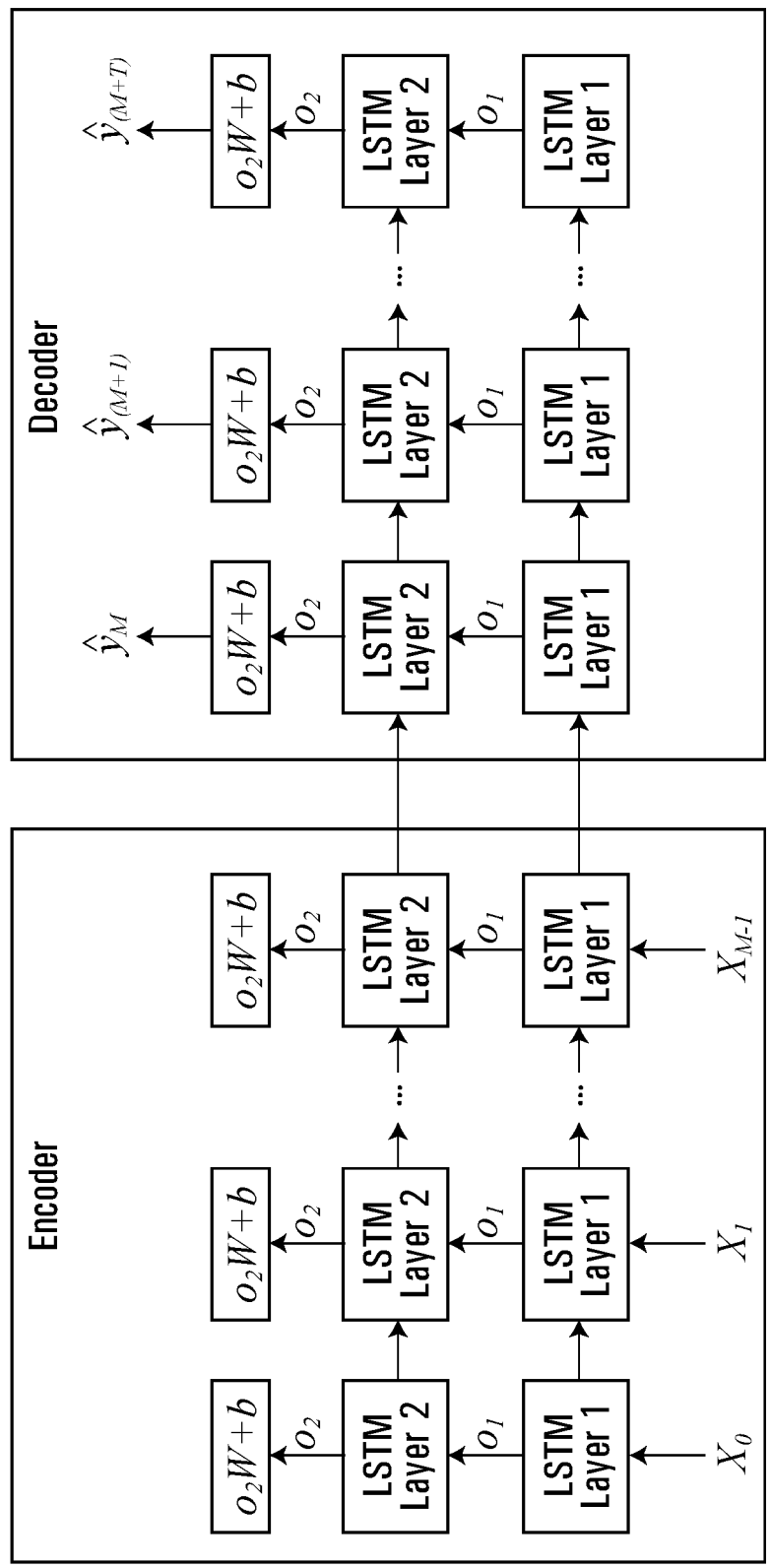
FIG. 4 is an example of a long short-term memory model in accordance with embodiments of the disclosure.

An example LSTM model is shown in FIG. 4. In FIG. 4, $X_i$ is a feature vector, and $Y_i$ is forecasted electricity usage. In the embodiment of FIG. 4, an example feature vector $X_i$ inputted to an LSTM model comprises past electricity usage y at time step i−1, weather at time step i, and date and time at time step i, as per the following:

$$X_i = [y_{i-1}, \text{weather}_i, \text{date time}_i]$$

In order to train the machine learning model, a set of demand training data is used as an input to the machine learning model. The demand training data comprises data representing past electricity usage at site 22. The past electricity usage may be determined for example by periodically obtaining meter readings from meters 21. In addition to past electricity usage, the demand training data comprises data representing a number of other different parameters related to electricity usage at site 22 over a period of time. For example, the demand training data may comprise data representing any prevailing weather conditions at site 22, for example temperature, humidity, date and time information (for example information relating to time of day, day of the week, month, and whether not a day is a site holiday). Other parameters may form part of the demand training data. The demand training data is preferably obtained over a relatively long period of time, for example two years.

Inputting the demand training data to the machine learning model trains the machine learning model to forecast electricity usage at site 22 as a function of past electricity usage at site 22. In other words, the machine learning model is able to determine possible relationships between past electricity usage (including past weather conditions and date/time information) and future electricity usage, by analyzing the demand training data to determine trends within the demand training data. Once the machine learning model has been trained using the electricity usage training data, the trained machine learning model may be used to forecast future electricity usage at site 22, by using known, past demand usage data.

Figure 5:
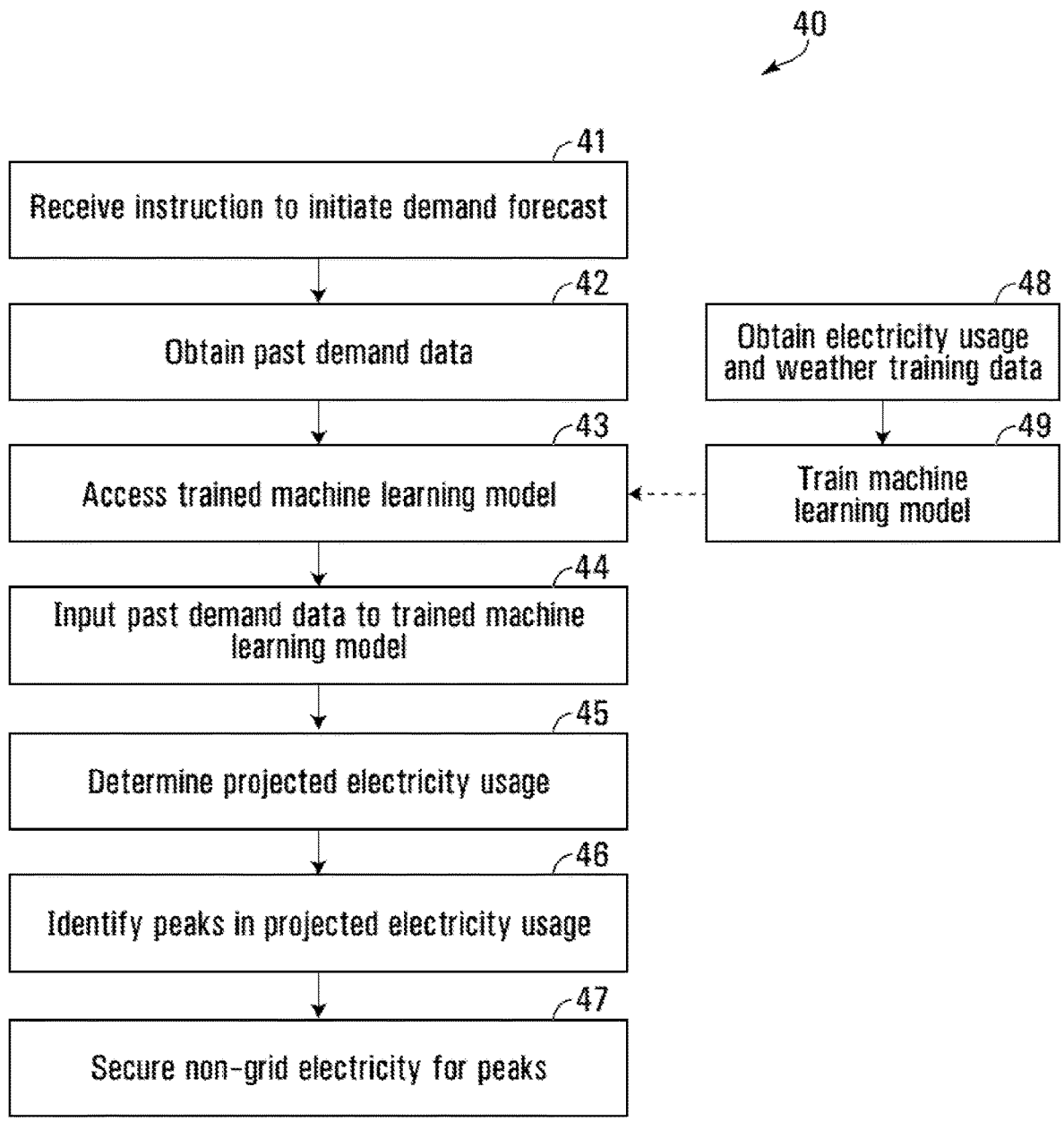
FIG. 5 is a flow diagram showing a method of managing electricity demand, in accordance with an embodiment of the disclosure.

FIG. 5 is a flowchart showing operations that may be taken by energy management system processor (EMSP) 36 in managing electricity demand at site 22, by performing an electricity demand management method 40. At block 41, EMSP 36 receives an instruction from a user of demand management system 20 to initiate a demand forecast, by performing electricity demand management method 40. The instruction specifies a future time period over which forecasting module t is to forecast future electricity usage. At block 42, EMSP 36 obtains past demand data. The past demand data comprises past electricity usage data representing past electricity usage at site 22. The past electricity usage data may be obtained for example by periodically obtaining meter readings from meters 21. In addition to past electricity usage data, the past demand data comprises data representing a number of other different parameters related to electricity usage at site 22 over a period of time. For example, the past demand data comprises data representing any prevailing weather conditions at site 22, temperature (for example temperature of batteries 25 as well as ambient temperature), atmospheric humidity, atmospheric pressure, and date and time information representing the particular future time period the user wishes to forecast. Other parameters may form part of the past demand data.

In some embodiments, the past demand data represents data over a one-week period. In addition, the period of time corresponding to the past demand data extends from a past point in time to a current point in time. In other words, the period of time corresponding to the past demand data extends from a past point in time to the point in time at which EMSP 36 is instructed to carry out electricity demand management method 40. Thus, the past demand data may be obtained from a "rolling window" as time goes forward. In this manner, more recent demand data may be used as an input to the machine learning model, thereby improving the accuracy of the forecast.

At block 43, EMSP 36 accesses the trained machine learning model. As described above, the trained machine learning model may be downloaded to EMSP 36. Alternatively, the trained machine learning model may be stored on a device or devices external to EMSP 36, such that EMSP 36 sends the past demand data to the external device or devices for inputting to the trained machine learning model, and receives from the external device or devices output from the trained machine learning model. Blocks 48 and 49 represent respectively obtaining the demand training data, as described above, and training the machine learning model using the demand training data.

At block 44, the past demand data is inputted to the trained machine learning model. At block 45, the trained machine learning model outputs projected electricity usage data representing projected electricity usage at site 22 for the future time period selected by the user.

In some embodiments, the user may request a forecast of the expected or projected electricity usage at site 22 for any amount of time up to the following 24 hours, with a granularity of 15 minutes. Of course, in other embodiments the forecast may be extended to longer or smaller time horizons, with greater or smaller granularities. In order to perform the forecasting, in one embodiment the trained machine learning model uses 96 support vector machine (SVR) models. Each SVR model is configured to forecast projected electricity usage for a specific future time slot (i.e. a specific 15-minute tranche). For example, the first SVR model is used to forecast the immediately subsequent 15 minutes; in other words, the 15 minutes that follow the point in time that EMSP 36 is instructed to perform the forecast. The second SVR model is used to forecast the 15-30 minute time slot; in other words, the 15 minutes that follow a point in time 15 minutes after EMSP 36 is instructed to perform the forecast; etc. By integrating multiple ones of 96 forecasts of the 96 SVR models, a forecast horizon of 24 hours with 15-minute granularity may be generated. As mentioned above, the number of SVR models can be tuned to forecast for different time horizons, and with different granularity, and thus any number of SVR models may in practice be used to forecast projected electricity usage.

The past demand data is represented using feature vectors as described below. Let d denote the current day and j−1 denote the current time. The first SVR model is used to forecast the electricity usage of day d at time j−1+1. The second SVR model is used to forecast the electricity usage of day d at time j−1+2. More generally, the $m^{th}$ SVR model is used to forecast the electricity usage of day d at time j−1+m. Each feature vector comprises data relating to one or more of the parameters identified above. For example, in addition to past electricity usage, each feature vector may comprise data relating to prevailing weather conditions at site 22, temperature (for example temperature of batteries 25 as well as ambient temperature), atmospheric humidity, atmospheric pressure, and date and time information representing the particular future time period the user wishes to forecast.

An example feature vector is shown below:

| Load | cooling | heating | extra heating | humidity | day of week | month | holiday | period to be forecasted |
|------|---------|---------|---------------|----------|-------------|-------|---------|-------------------------|

Take for example the past electricity usage of the $m^{th}$ SVR model. The $m^{th}$ SVR model uses as an input the load (past electricity usage) of time (j−1+m). Thus,

[load(0), load(1), . . . , load(15)] may be the load of day d−7 at time (j−1+m)−6, (j−1+m)−5, . . . , (j−1+m), (j−1+m)+1, . . . , (j−1+m)+9.

[load(16), load(17)] may be the load of day d−3 at time (j−1+m)−1, (j−1+m).

[load(18), load(19)] may be the load of day d−2 at time (j−1+m)−1, (j−1+m).

[load(20), load(21), . . . , load(25)] may be the load of day d−1 at time (j−1+m)−6, . . . , (j−1+m)−1, (j−1+m).

[load(26), load(27), . . . , load(121)] may be the load of day d at time j−96, j−95, . . . , j−2, j−1 (i.e. all the load/past electricity usage information of the past 24 hours).

Examples of load and cooling data in feature vectors are shown in FIGS. 6A and 6B. Note that as mentioned above the feature vectors may comprise data relating to additional parameters (not shown in FIGS. 6A and 6B).

Once EMSP 36 has performed the forecast, at block 46, EMSP 36 identifies one or more peaks in the projected electricity usage. The peaks may be identified by comparing the projected electricity usage to an electricity demand threshold (for example electricity demand threshold 16 as can be seen in FIG. 1). There are various methods known in the art for identifying such peaks.

At block 47, EMSP 36 transmits one or more instructions for securing non-grid electricity for managing the projected electricity demand. In particular, EMSP 36 transmits one or more instructions for securing non-grid electricity for use during the future periods corresponding to the identified peaks. Non-grid electricity may be derived from various distributed energy/electricity resources, such as batteries 25 and/or photovoltaic cells 24, or other on-site energy generation (such as combined heat and power generation, or from a diesel/gas generator). During relatively steady-state electricity usage (such as during the period corresponding to steady-state demand 12 in FIG. 1), grid-based electricity may be used when needed. However, during periods of peak power demand (such as during the periods corresponding to peaks 14 in FIG. 1), electricity from non-grid sources may be used so as to reduce the overall cost to the site owner.

EMSP 36 may be configured to take into account current electricity reserves in non-grid sources, such as in batteries 25 and/or photovoltaic cells 24, before determining from which non-grid source(s) to draw stored electricity so as to perform peak shaving. Furthermore, EMSP 36 may use the past demand data to determine the non-grid source for use during the periods of peak demand. In particular, the past demand data may also comprise data representing battery and photovoltaic cell storage over a past time period. Using the trained machine learning model, EMSP 36 may determine from the past demand data projected battery and photovoltaic cell storage over a future time period. Thus, by using past battery and photovoltaic cell storage data, EMSP 36 may predict future battery and photovoltaic cell storage. This information may be used by EMSP 36 to better anticipate from which non-grid source electricity is to be used for shaving the peaks, based on the amount of stored electricity in the non-grid sources.

EMSP 36 may further comprise different optimization routines for securing the non-grid electricity. Individual optimization routines may be selected by a user as a function of what is desired to be achieved. For example, if it is necessary to shave the peaks as much as possible without concern for completely draining the non-grid electricity sources, then EMSP 36 may be configured to instruct the drawing of as much electricity as allowable from batteries 25 and photovoltaic cells 24 during the peak demand periods. Alternatively, if it is important to reserve some non-grid electricity in case a sudden unexpected peak demand occurs, then EMSP 36 may be configured to instruct the drawing of no more than a certain, preset amount of electricity from batteries 25 and/or photovoltaic cells 24 during the peak demand periods.

Reserving Battery Capacity

According to embodiments of the disclosure, it may be desirable to reserve a capacity of batteries 25, in order to mitigate the effect of unforeseen demand spikes. For example, errors in forecasting by forecasting module 31 may result in the failure to anticipate or predict one or more future demand spikes and thereby potentially expose the user to additional demand charges. In order to ensure that there remains some capacity within batteries 25 in order to meet such unforeseen demand spikes, embodiments of the disclosure provide methods and systems that reserve a capacity of batteries 25, as now described in further detail.

Figure 7:
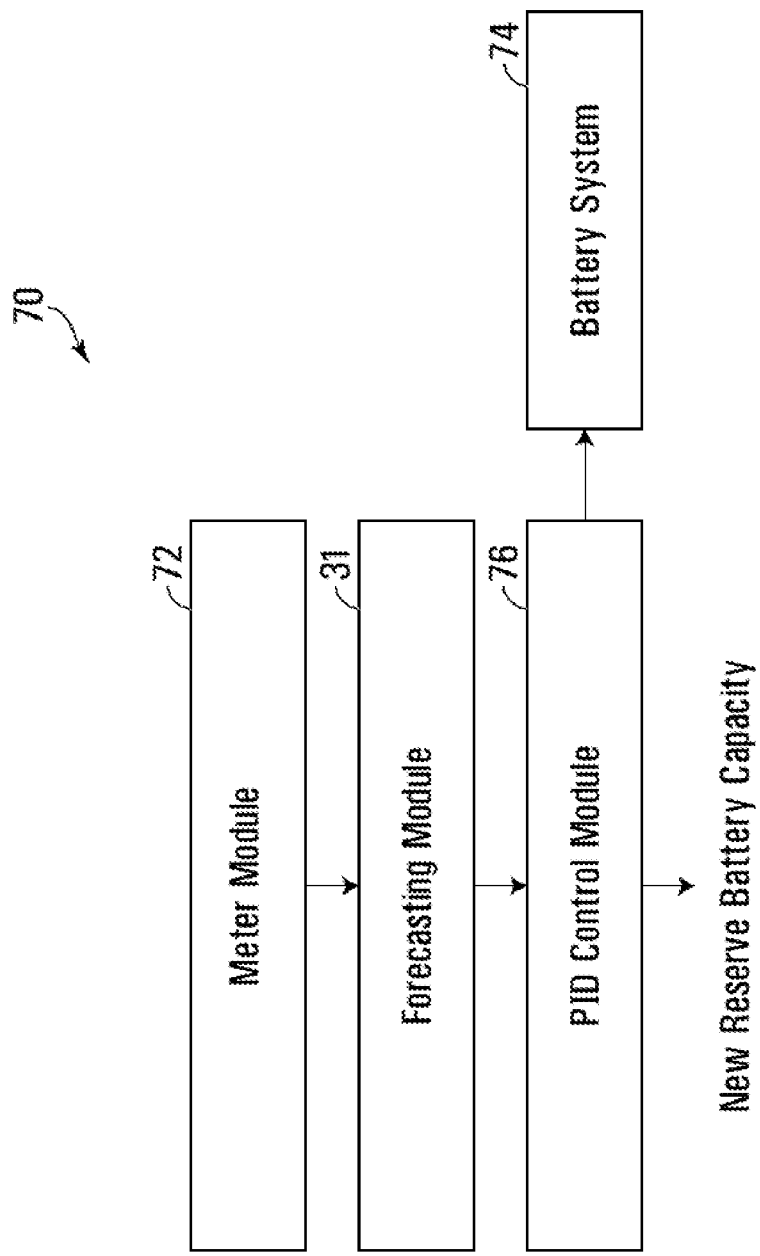
FIG. 7 is a schematic diagram of a system for reserving battery capacity, according to embodiments of the disclosure.

Turning to FIG. 7, there is shown an example of a system 70 for reserving a capacity of batteries 25. System 70 includes a meter module 72, forecasting module 31 (which may be the same forecasting module 31 seen in FIG. 3), a battery system 74, and a proportional-integral-derivative (PID) control module 76 (which, according to some embodiments, may be control algorithm module 35 of FIG. 3). Meter module 72 obtains meter data (for example data relating to historical electricity demand) from meters 21 and provides the data to forecasting module 31. As described in more detail below, forecasting module 31 is configured to determine a forecasting error and provide the forecasting error to PID control module 76. Battery system 74 obtains battery data (for example data relating to a current state-of-charge (SOC)) from batteries 25 and provides the battery data to PID control module 76. PID control module 76 uses the forecasting error and the current SOC provided by battery system 74 to determine a capacity of batteries 25 that is to be reserved, as now described in more detail. According to some embodiments, data relating to energy stored in other renewable energy sources (such as photovoltaic cells) may also be provided to PID control module 76 (for example by using data obtained from inverters 23). Such data may additionally be used by PID control module 76 to determine a capacity of energy that is to be reserved in such other renewable energy sources.

Figure 8:
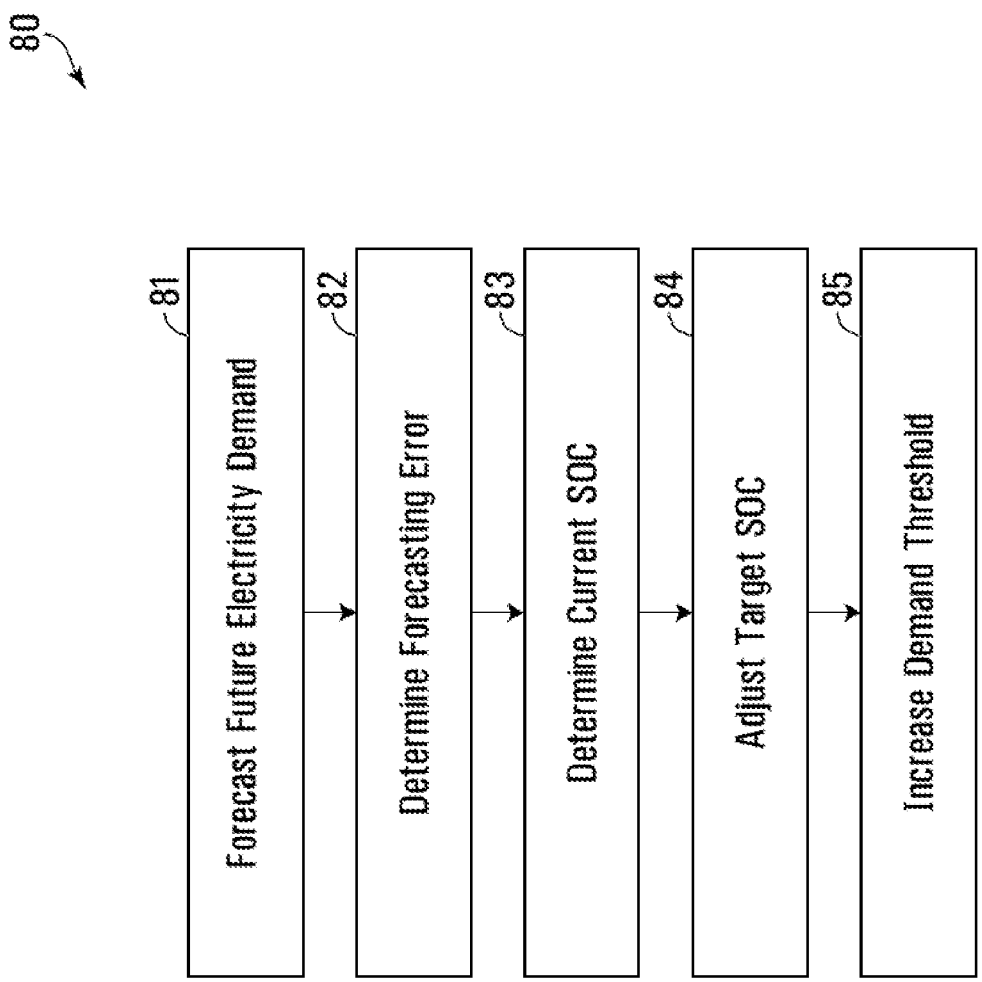
FIG. 8 is a flow diagram of a method of reserving battery capacity, according to embodiments of the disclosure.

Turning to FIG. 8, there is shown a method 80 of reserving battery capacity, according to embodiments of the disclosure.

At block 81, future electricity demand of site 22 is forecasted. The future electricity demand may be forecasted using any of the above methods described in connection with FIGS. 2-6B. For example, forecasting module 31 may be configured to apply a trained machine learning model to a set of past demand data obtained from meter module 72, in order to forecast a future load at site 22. The past demand data comprises, amongst other data, past electricity usage data at site 22. The machine learning model is trained using demand training data which comprises electricity usage training data. The machine learning model may be trained by forecasting module 31 itself or alternatively the trained machine learning model may be downloaded to forecasting module 31, for example via cloud gateway 32 communicating with an external cloud 33. Thus, the machine learning model may be trained externally to demand management system 20, and subsequently obtained by forecasting module 31.

The machine learning model may be any appropriate machine learning model suitable for the purposes described herein. In some embodiments, the machine learning model may be a support vector regression (SVR) model. In other embodiments, the machine learning model may be a long short-term memory (LSTM) model. Examples of an SVR model and an LSTM model that may be employed by forecasting module 31 are described above in connection with FIG. 4.

In order to train the machine learning model, a set of demand training data is used as an input to the machine learning model. The demand training data comprises data representing past electricity usage at site 22. The past electricity usage may be determined for example by periodically obtaining meter readings from meters 21. In addition to past electricity usage, the demand training data comprises data representing a number of other different parameters related to electricity usage at site 22 over a period of time. For example, the demand training data may comprise data representing any prevailing weather conditions at site 22, for example temperature, humidity, date and time information (for example information relating to time of day, day of the week, month, and whether or not a day is a site holiday). Other parameters may form part of the demand training data. The demand training data is preferably obtained over a relatively long period of time, for example two years.

Inputting the demand training data to the machine learning model trains the machine learning model to forecast electricity usage at site 22 as a function of past electricity usage at site 22. In other words, the machine learning model is able to determine possible relationships between past electricity usage (including past weather conditions and date/time information) and future electricity usage, by analyzing the demand training data to determine trends within the demand training data. Once the machine learning model has been trained using the electricity usage training data, the trained machine learning model may be used to forecast future electricity usage at site 22, by using known, past demand usage data.

Using the past demand usage data, forecasting module 31 forecasts future demand usage at site 22, using the methods described above in connection with FIG. 5.

Returning to FIG. 8, at block 82, forecasting module 31 determines a forecasting error. The forecasting error may be an error between the forecasted future electricity demand of site 22 and an actual electricity demand of site 22, over the same time period. In other words, the forecasting error is indicative of the inaccuracy of the forecast of the future electricity demand. The forecasting error may be adjusted based on one or more historical forecasting errors. For example, the forecasting error determined for a period during which electricity demand tends to be unpredictable may be adjusted based on one or more historical forecasting errors determined in the past for similar periods of time (e.g. for similar times of day during which electricity demand tends to be unpredictable). The forecasting error is transmitted to PID control module 79.

Figure 9:
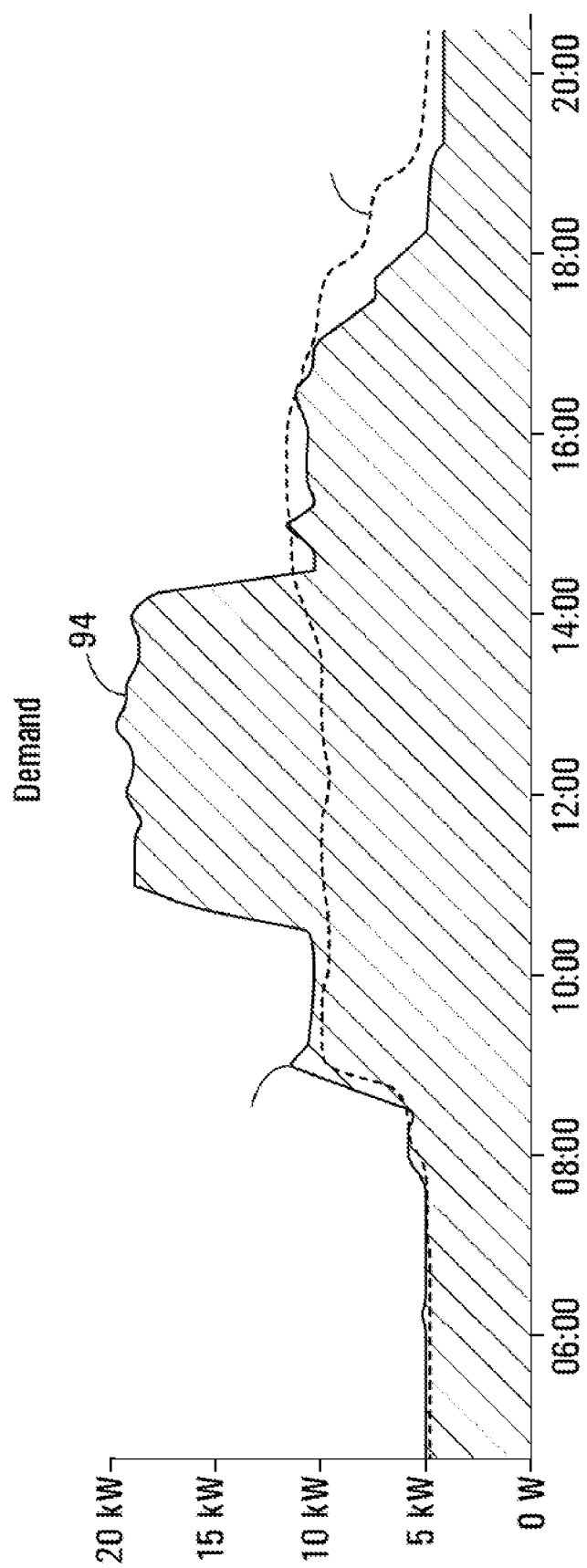
FIG. 9 is a plot of actual electricity demand vs. forecasted electricity demand.

Turning to FIG. 9, there is shown a plot of actual demand 90 and forecasted demand 92 over time. As can be seen, forecasted demand 90 fails to anticipate a demand spike 94, leading to a significant forecasting error during the period of demand spike 94.

Returning to FIG. 8, at block 83, PID control module 76 obtains from battery system 74 the current SOC of batteries 25. At block 84, PID control module 76 uses a PID feedback to adjust a target SOC of batteries 25. At block 85, based on the updated target SOC, PID control module 76 adjusts the demand threshold (the threshold above which electricity demand is met by non grid-based sources). For example, if the target SOC is increased, then the demand threshold is increased, thereby reserving a capacity of batteries 25. Conversely, if the target SOC is decreased, then the demand threshold is decreased, and thereby a greater proportion of demand is met through non grid-based sources, such as batteries 25 (which generally reduces the user's exposure to increased demand charges). An example of the effect of method 80 is now illustrated in connection with FIGS. 10 and 11.

Figure 10:
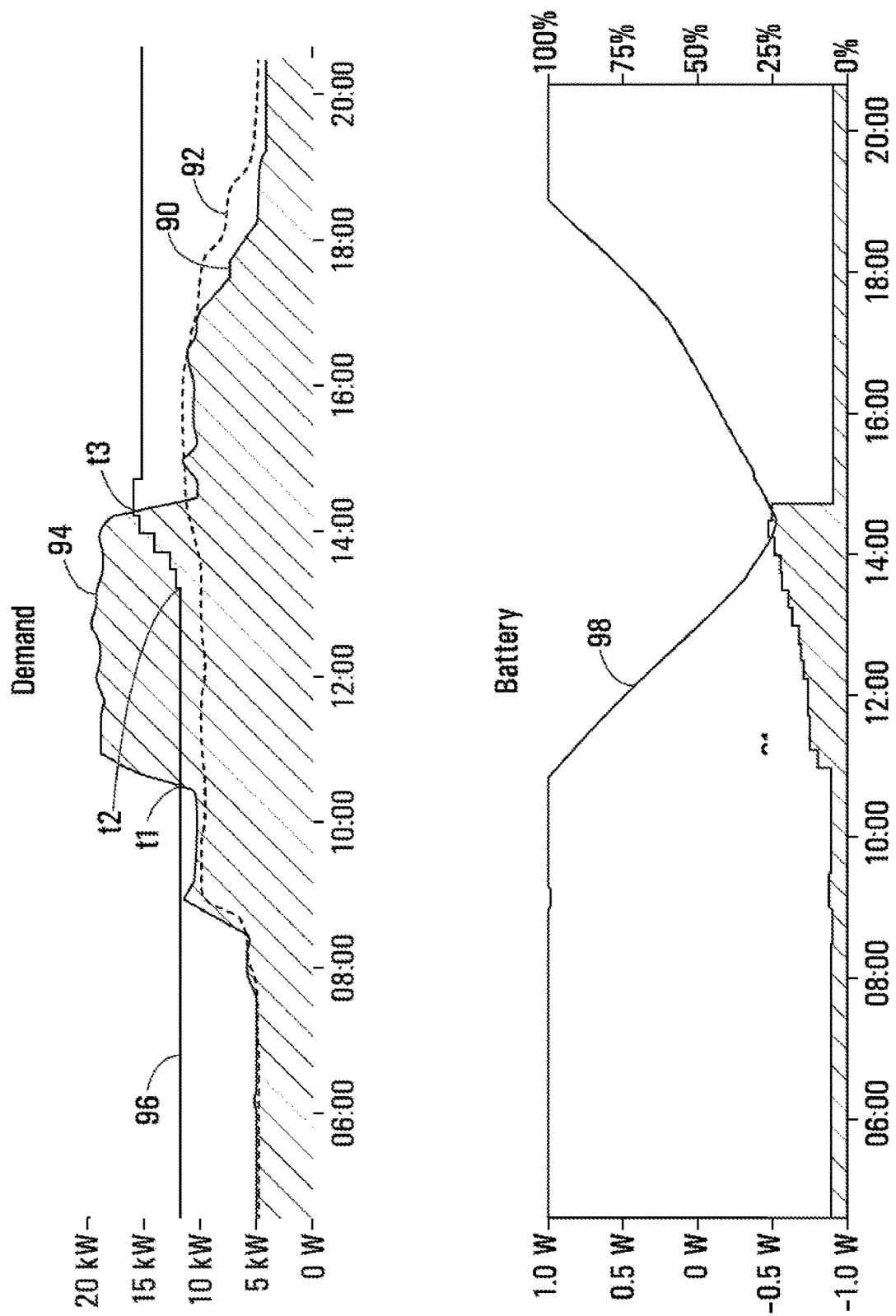
FIGS. 10 and 11 show plots of actual electricity demand, forecasted electricity demand, a demand threshold, a metered load, aggregated state-of-charge, and target state-of-charge, according to embodiments of the disclosure.

Turning to FIG. 10, there is shown the plot of FIG. 9 with a demand threshold 96 overlaid thereon. In addition, there is shown a plot of aggregated SOC 98 of batteries 25 and target SOC 91 as a function of time. Target SOC 91 begins at a nominal 5% (according to other embodiments, target SOC 91 may begin at other values) and, as described in further detail below, may increase as the difference between actual electricity demand 90 and forecasted demand 92 increases. Thus, battery reserve is generally used as much as possible to meet electricity demand until uncertain loads are observed in which case battery reserve is increased in order to better manage the uncertain loads. A higher forecasting error indicates lower confidence in the forecast, and thus system 70 hedges against the uncertainty by reserving some battery capacity for future use.

At time t1, actual electricity demand 90 exceeds demand threshold 96, resulting in aggregated SOC 98 of batteries 25 reducing (i.e. batteries 25 begin to discharge) in order to meet the increase in electricity demand. Furthermore, at approximately t1, the forecasting error begins to increase as actual electricity demand 90 exceeds more and more forecasted demand 92. Thus, using method 80 described above, PID control module 74, in response to detecting the increase in forecasting error, causes target SOC 91 to increase. The increase in target SOC 91 causes demand threshold 96 to begin increasing at time t2. A lag exists between the increase in target SOC 91 and the increase in demand threshold 96. For example, PID control module 74 may cause demand threshold 96 to increase only after identifying a trend in the forecasting error. As demand spike 94 ends, at time t3 the demand drops below demand threshold 96, and the demand is then met by grid-based sources as described above, allowing batteries 25 to be recharged as can be seen by aggregated SOC 98 in the lower plot. In addition, as actual demand 90 approaches forecasted demand 92, the forecasting error decreases, resulting to PID control module 76 decreasing target SOC 91.

Thus, by increasing demand threshold 96 in response to an increase in forecasting error and/or a decrease in the current SOC of batteries 25, a greater proportion of electricity demand is met by grid-based sources, ensuring an increased reserve of battery capacity for any unexpected demand peaks that may occur in the future.

Figure 11:
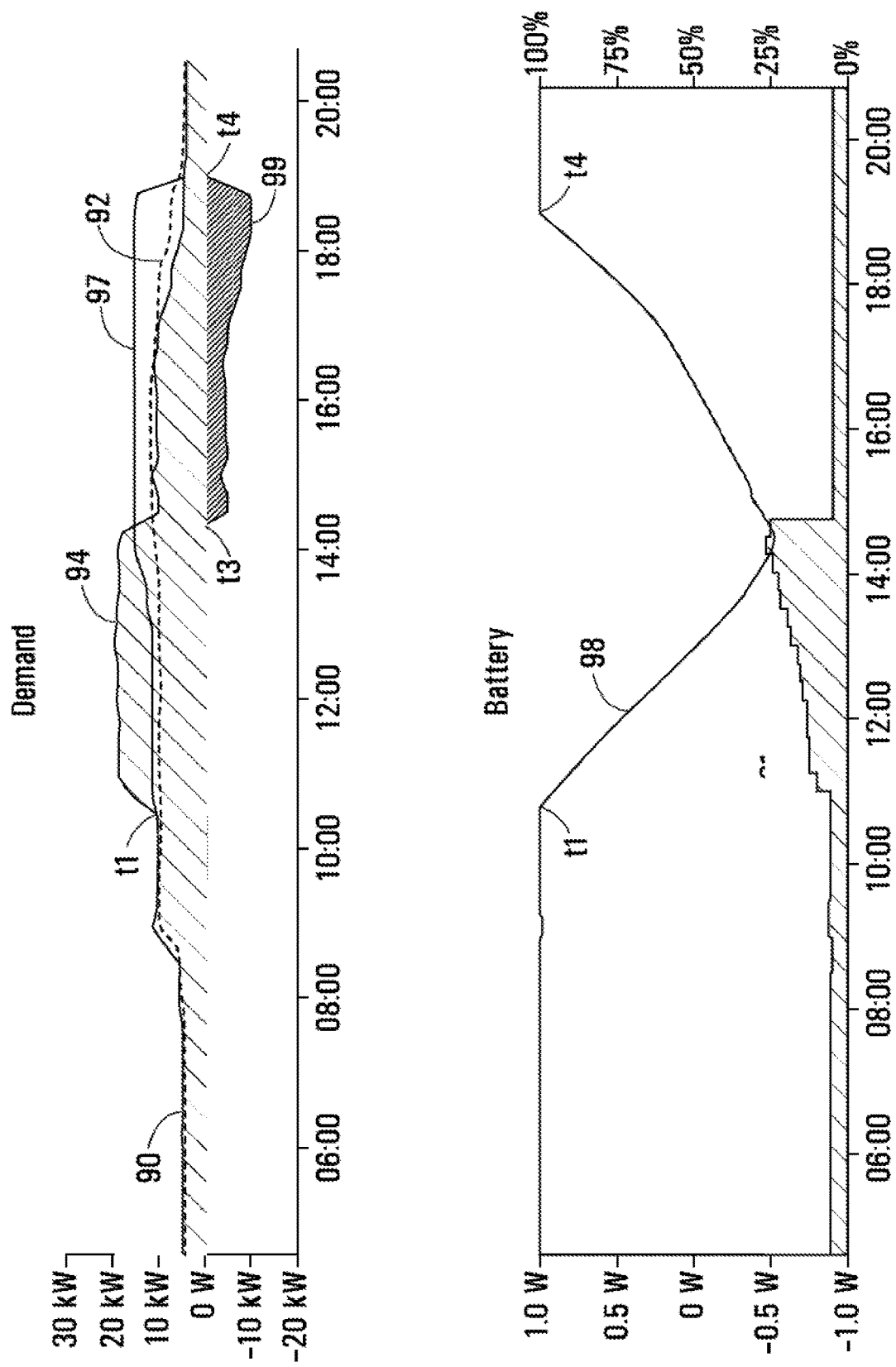

FIG. 11 shows the same demand profile as that of FIG. 10 but additionally shows the metered demand 97 of the system (i.e. the grid-based electricity demand). The total electricity demand or consumption 90 is therefore the sum of metered demand 97 and the power output 99 of batteries 25. In the embodiment of FIG. 11, as demand spike 94 causes electricity demand 90 to increase above the demand threshold (not shown but corresponding to metered demand 97), batteries 25 begin to discharge at time t1, as seen by trace 98 (representing the aggregated SOC 98 of batteries 25). As the demand threshold increases, and as demand spike 94 abates, batteries 25 begin charging at t3 (when electricity demand 90 drops below the demand threshold). As electricity demand 90 remains below the demand threshold, batteries 25 charge at a maximum rate while keeping metered demand 97 at or below the demand threshold. In the case of FIG. 11, from t3 until the end of the charging, metered demand 97 is kept at the demand threshold.

As can be seen from FIG. 11, during recharging of batteries 25, the demand threshold is set to metered demand 97, in order for batteries 25 to be recharged as quickly as possible. A slower charging rate is also possible, but the system is preferably configured to recharge batteries 25 as quickly as possible (without exceeding the demand threshold), to thereby provide maximum battery reserve in as short an amount of time as possible. This may enable a user to better manage future unexpected demand spikes with reserve battery capacity. The demand threshold may be generally set to be the maximum monthly metered load.

Improved Photovoltaic Cell Forecasting

According to embodiments of the disclosure, the production of photovoltaic (PV) cells 24 may be forecasted using the above-described SVR model. In certain cases, such forecasting may represent an improvement over traditional methods of forecasting PV cell production. Such traditional methods generally rely on forecasting based on one or more physical parameters of the PV cells. While this may provide accurate forecasting during periods of good weather, i.e. with minimal or no cloud cover, the accuracy of such forecasting may decrease as cloud cover increases and it becomes more difficult to accurately predict future production of the PV cells.

Turning to FIG. 12, there is shown a method of forecasting PV cell production, according to embodiments of the disclosure.

At block 122, forecasting module 31 obtains PV cell production training data, to be used in training a machine learning model. The machine learning model may be trained by forecasting module 31 itself or alternatively the trained machine learning model may be downloaded to forecasting module 31, for example via cloud gateway 32 communicating with an external cloud 33. Thus, the machine learning model may be trained externally to demand management system 20, and subsequently obtained by forecasting module 31. The machine learning model may be any machine learning model suitable for the purposes described herein. In some embodiments, the machine learning model is a support vector regression (SVR) model. In other embodiments, the machine learning model is a long short-term memory (LSTM) model. Examples of an SVR model and an LSTM model that may be employed by forecasting module 31 are described above in connection with FIG. 4.

At block 124, the machine learning model is trained. In order to train the machine learning model, the PV cell production training data is used as an input to the machine learning model. The PV cell production training data comprises data comprises data relating to historical PV cell production as a function of prevailing weather. The historical PV cell production may be determined for example by periodically obtaining readings from inverters 23. In addition to historical PV cell production data, the PV cell production training data comprises data related to prevailing weather conditions at site 22 during the period corresponding to the historical PV cell production. For example, such weather data may include data relating to cloud cover, intensity of sunlight, temperature, humidity, atmospheric pressure, amount of precipitation, type of precipitation, wind speed, wind gusts, months of a year, time of day, dates, and days of a week. Other parameters may form part of the PV cell production training data. The weather data may be provided by a third-party source. The PV cell production training data is preferably obtained over a relatively long period of time, for example two years.

Inputting the PV cell production training data to the machine learning model trains the machine learning model to forecast PV cell production at site 22 as a function of past PV cell production at site 22. In other words, the machine learning model is able to determine possible relationships between past PV cell production as a function of weather, and future PV cell production as a function of future forecasted weather, by analyzing the PV cell production training data to determine trends within the PV cell production training data. Once the machine learning model has been trained using the PV cell production training data, the trained machine learning model may be used to forecast future PV cell production at site 22, by using known, past PV cell production data.

At block 126, past PV cell production data is obtained. At block 128, forecasting module 31 returns the forecasted PV cell production, by inputting the past PV cell production data to the trained machine learning model. In order to forecast PV cell production, any of the methods described above in connection with FIG. 5 may be used.

In particular, demand management system 20 first receives an instruction from a user to initiate a PV cell production forecast. The instruction specifies a future time period over which forecasting module 31 is to forecast PV cell production. The period of time corresponding to the past PV cell production extends from a past point in time to a current point in time. In other words, the period of time corresponding to the past PV cell production extends from a past point in time to the point in time at which EMSP 36 is instructed to perform the forecasting. Thus, the past PV cell production data may be obtained from a "rolling window" as time goes forward. In this manner, more recent PV cell production data may be used as an input to the machine learning model, thereby improving the accuracy of the forecast.

The past PV cell production data is inputted to the trained machine learning model, and at block 128 the trained machine learning model outputs projected PV cell production data representing projected PV cell production at site 22 for the future time period selected by the user.

In some embodiments, the user may request a forecast of the expected or projected PV cell production at site 22 for any amount of time up to the following 24 hours, with a granularity of 15 minutes. Of course, in other embodiments the forecast may be extended to longer or smaller time horizons, with greater or smaller granularities. In order to perform the forecasting, in one embodiment the trained machine learning model uses 96 support vector machine (SVR) models. Each SVR model is configured to forecast projected electricity usage for a specific future time slot (i.e. a specific 15-minute tranche). For example, the first SVR model is used to forecast the immediately subsequent 15 minutes; in other words, the 15 minutes that follow the point in time that EMSP 36 is instructed to perform the forecast. The second SVR model is used to forecast the 15-30 minute time slot; in other words, the 15 minutes that follow a point in time 15 minutes after EMSP 36 is instructed to perform the forecast; etc. By integrating multiple ones of 96 forecasts of the 96 SVR models, a forecast horizon of 24 hours with 15-minute granularity may be generated. As mentioned above, the number of SVR models can be tuned to forecast for different time horizons, and with different granularity, and thus any number of SVR models may in practice be used to forecast projected electricity usage.

Thus, according to method 120, a machine learning model may be used to better forecast PV cell production. In particular, past PV cell production as a function of weather may be used to forecast future PV cell product as a function of future forecasted weather.

According to further embodiments of the disclosure, forecasting module 31 may be configured to forecast PV cell production according to more than one forecasting model, and may be configured to transition between multiple forecasting models. In particular, forecasting module 31 may be configured to transition between a first forecasting module, in which forecasting is performed according to one or more physical parameters of PV cells 24, and a second forecasting model, in which forecasting is performed based at least partially on historical data relating to past PV cell production as a function of weather.

The one or more physical parameters of the first forecasting model may include PV cell type, PV cell quantity, PV cell model, azimuth, tilt, latitude, longitude, and elevation. The first forecasting model may use any of the methods described in Stein, Joshu S, et al, *"PVLIB: Open Source Photovoltaic Performance Modeling Functions for Matlab and Python"*, Sandia National Lab. (SNL-NM), Albuquerque, N. Mex. (United States), May 1, 2016, which is herein incorporated by reference in its entirety.

Turning to FIG. 13, according to embodiments of the disclosure, there is shown a method of forecasting PV cell production based on multiple forecasting models.

At block 132, forecasting module 31 forecasts future PV cell production according to the first forecasting model. For example, forecasting module 31 forecasts future PV cell production using any of the methods described in *PVLIB: Open Source Photovoltaic Performance Modeling Functions for Matlab and Python*. At block 134, forecasting module 31 determines a forecasting error between the forecasted PV cell production and actual PV cell production. If the forecasting error becomes too large, then at block 136 forecasting module 31 may determine that the current (first) forecasting model is ineffectively forecasting PV cell production. Thus, forecasting module 31 may transition from the first forecasting model to the second forecasting model.

For example, as described above, the first forecasting model which relies on physical parameters of PV cells 25 is generally accurate to the extent that cloud cover is nonexistent or minimal. If cloud cover increases sufficiently, the forecasting error will increase until forecasting module 31 determines that forecasting should now proceed on the basis of the second forecasting model. According to the second forecasting model, PV cell production is forecasted according to a hybrid approach of the first, physical forecasting model and the machine learning-based model described above in connection with FIG. 12. Thus, according to the second forecasting model, PV cell production is forecasted based on a combination of one or more physical parameters of PV cells 25 (using for example the methods described in *PVLIB: Open Source Photovoltaic Performance Modeling Functions for Matlab and Python*) and historical data relating to past PV cell production of PV cells 25 as a function of weather. In particular, PV cell production is first forecasted based on one or more physical parameters of PV cells 25. Subsequently, the output of the forecasting according to the first forecasting model is then used as an input to the machine learning-based model described above in connection with FIG. 12.

According to the second, hybrid forecasting model, the forecasting error may be small when there is significant cloud cover. However, when cloud cover decreases sufficiently, the forecasting error will increase, and the forecasting module 31 may then transition back to the first forecasting model.

Figure 14:
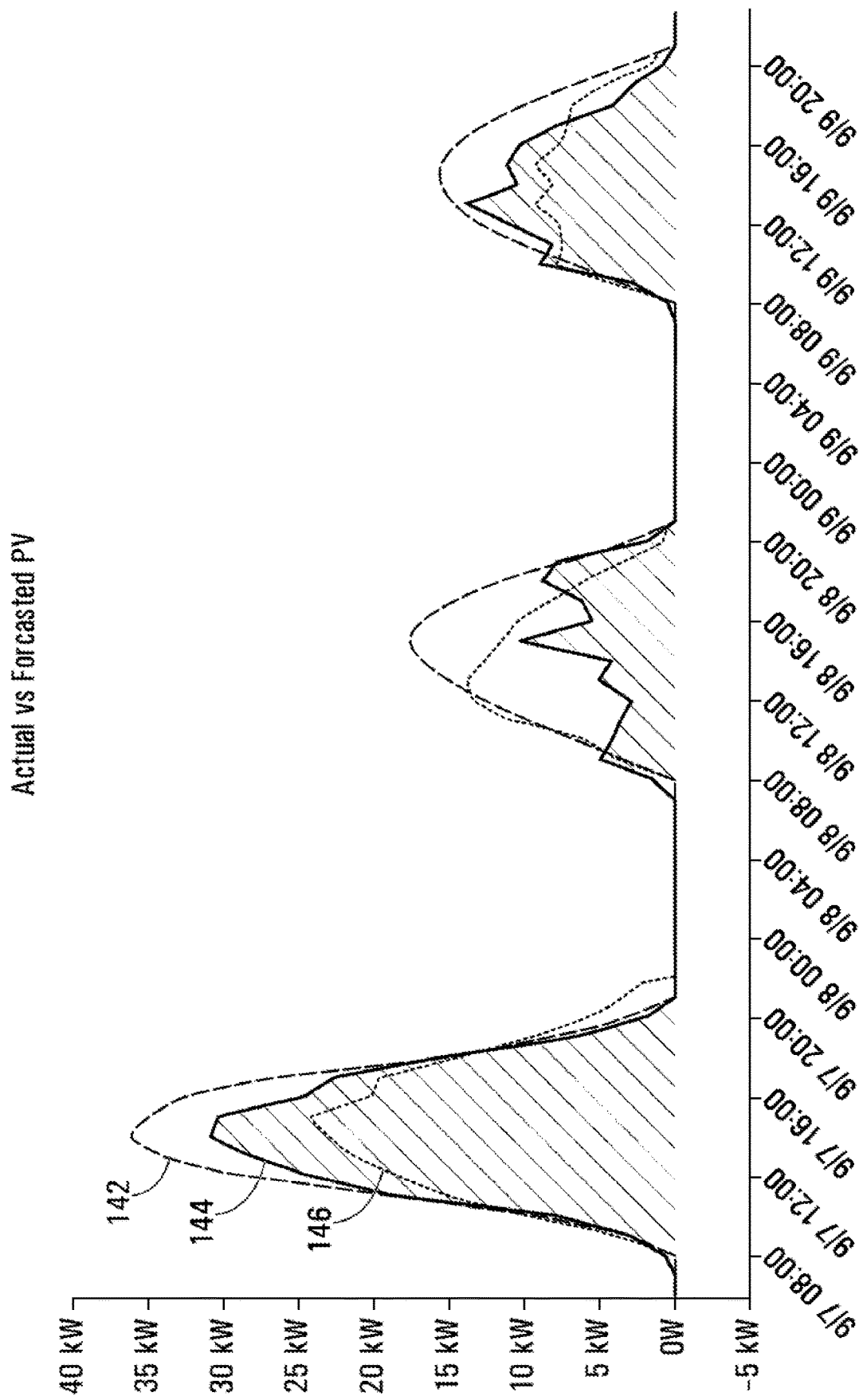
FIG. 14 is a plot of actual PV cell production vs. forecasted PV cell production, according to embodiments of the disclosure.

FIG. 14 shows an example plot of actual PV cell production 144, forecasted PV cell production 142 based on the first, physical forecasting model, and forecasted PV cell production 146 based on the second, hybrid forecasting model. FIG. 14 shows that the second, hybrid forecasting model provides an improved method for estimating PV cell production.

Load Prediction

The foregoing embodiments describe examples in which the demand management system 20 is already installed at the site 22. Given the significant installation and operating costs associated with deploying the system 20, it can be beneficial to know in advance of installing the system 20 at the site 22 whether the system 20 will match its predicted operation once deployed.

Various technical problems are associated with making this determination, in that feasibility and efficiency are based on a number of factors that may be difficult to predict. These factors may comprise, for example, the shape of the curve of actual demand 90 that the site 22 will experience once the system 20 is deployed. In particular, the "peakiness" of the demand 90 as measured by total number/volume, frequency, magnitude, and/or duration of demand spikes 94 may affect feasibility and efficiency. Any one or more of sporadic usage of high power appliances, power outages (random or planned), evacuation notices, special events (e.g., sporting events), and natural disasters may affect the shape of the demand 90. Additionally or alternatively, any one or more of the predictability of the demand 90, the capacity of the system 20 (e.g., as measured by the capacity of the batteries 25), weather, tariffs, and the type of application that acts as an electrical load and accordingly generates the demand 90 may affect feasibility and efficiency.

With respect to demand predictability in particular, one way in which to predict future demand 90 is to apply the SVR model described above in respect of the forecasting module 31. For example, a customer may bring data depicting past demand 90 for a site 22, train the SVR model as described in respect of block 49 above, and then apply the trained forecasting module 31 to additional past demand data as discussed in respect of blocks 44 and 45 above to determine projected energy usage. The projected energy usage may then be used to determine projected cost savings that would result from deploying the system 20. However, one technical problem related to projecting energy usage in this manner is the amount of time required to train and deploy the SVR model. For example, training and applying an SVR model in this manner using a year's worth of demand data divided into 15 minute increments may take over an hour. In many cases, this is practically unacceptable.

In at least some of the example embodiments described below, projected energy usage is determined by applying a computer-implemented model that is more computationally efficient than the SVR model described above. Consequently, demand may be predicted in a manner that is faster than applying the SVR model. Further, in at least some of the below example embodiments, a confidence score may be determined using the projected energy usage and/or other aspects of demand shape in order to facilitate predicting whether deploying the system 20 at a potential site 22 will match expected performance. More particularly, using the predicted demand, expected savings resulting from the deploying the system 20 may be determined with the confidence score representing a confidence that those savings will be realized should the system 20 be deployed.

Referring now to FIG. 15A, there is shown a user interface page 1500 that is displayed on a display 2002 of a computer 2006 (depicted in FIG. 20 and discussed in further detail below) being used by a user who to determine whether installing the system 20 at a potential site 22 is feasible, according to one example embodiment. The page 1500 comprises a site name field 1504, which shows the name of the site 22; an application type field 1506, which shows the end use of the system 20, such as "Demand Charge Management"; a load profile field 1508, which references (e.g., by way of a filename) the data depicting the demand profile of the site 22 based, for example, on actual past demand measurements; a tariff field 1510, which describes the tariff that a utility charges a customer based on the demand profile; a financial parameters field 1512, which describes the financial parameters affecting whether deploying the system 20 will be economically viable (e.g., whether the system 20 will be paid for in cash and/or financed; the amortization period for the system 20; and whether any rebate programs such as California's Self-Generation Incentive Program apply); and a configurations table 1502 listing various possible configurations of the system 20. The configurations table 1502 in FIG. 15A has seven rows respectively representing six different possible configurations of the system 20 when deployed at the site 22, and a baseline in which the site 22 is operated without the system 20.

In FIG. 15A, the configurations table 1502 also comprises nine columns 1514a-i that apply to each of the configurations of the system 20: a score column 1514a, which indicates a confidence score representing a likelihood that the a configuration's projected energy and consequently demand charge savings will match actual energy and consequently demand charge savings if deployed at the site 22; a configuration name column 1516b, which provides a descriptive name for a configuration; an electric bill column 1514c, which indicates the site's 22 projected annual electric bill were it to use the system 20; an energy savings column 1514d, which indicates the site's 22 projected annual energy savings were it to use the system 20; a demand savings column 1514e, which indicates the site's 22 projected savings associated with reduced demand charges were the system 20 to be deployed; a cost column 1514f, which indicates the initial capital investment required to install the system 20; a net present value column 1515g, which indicates the net present value of the cost in the cost column 1514f; an internal rate of return column 1514h, which indicates how quickly cost savings resulting from use of the system 22 recoup the initial capital cost in the cost column 1514f; and a payback period column 1514i, indicating the number of years until the system's 20 cost is recouped via electricity bill savings resulting from using the system 20. Only the configuration name and electric bill columns 1512b,c are populated for the baseline configuration, with the remaining columns 1512a,d-i not being applicable when the system 20 is not deployed.

In respect of the configuration name column 1516b, example configuration names may describe any one or more of total capacity of the batteries 25, total power that the batteries 25 can output, and total power available from any photovoltaic cells 24 comprising part of the system 20.

In respect of the electric bill column 1514c, and as depicted in the example page 1500 of FIG. 15A, the total annual electric bill may be depicted as two-color bar, with one color indicating the portion of the annual electric bill attributable to demand charges and the other color indicating the remaining portion of the electric bill. Using a bar in this manner quickly and intuitively permits a user to assess the portion of the site's 22 electric bill attributable to demand charges.

The score column 1514a in FIG. 15A depicts six scores ranging from 43 to 77; in at least the presently described example embodiment, possible scores range from 0-100, although in other embodiments possible scores may span different ranges. The scores are color coded, with scores under 50 being colored red, indicating a relatively low confidence that the system 20 will be able to deliver the demand savings shown in the energy savings column 1514d if deployed at the site 22; scores between 51-75 being colored yellow, indicating moderate confidence that the system 20 will be able to provide the demand savings shown in the energy savings column 1514d if deployed at the site 22; and scores between 76-100 being colored green, indicating a high confidence that the system 20 will be able to provide the demand savings shown in the energy savings column 1514d if deployed at the site 22. In at least some other example embodiments, the score may reflect not just the confidence level that the system 20 will be able to provide the depicted demand savings, but rather the overall economic feasibility of whether to install a system 20 of a given configuration. For example, in one example alternative embodiment, the scores may take into account the system's 20 capital cost, and accordingly if two different systems 20 both provide the same expected demand savings, the more expensive of those systems 20 has a lower score than the less expensive of those systems 20.

Figure 15B:
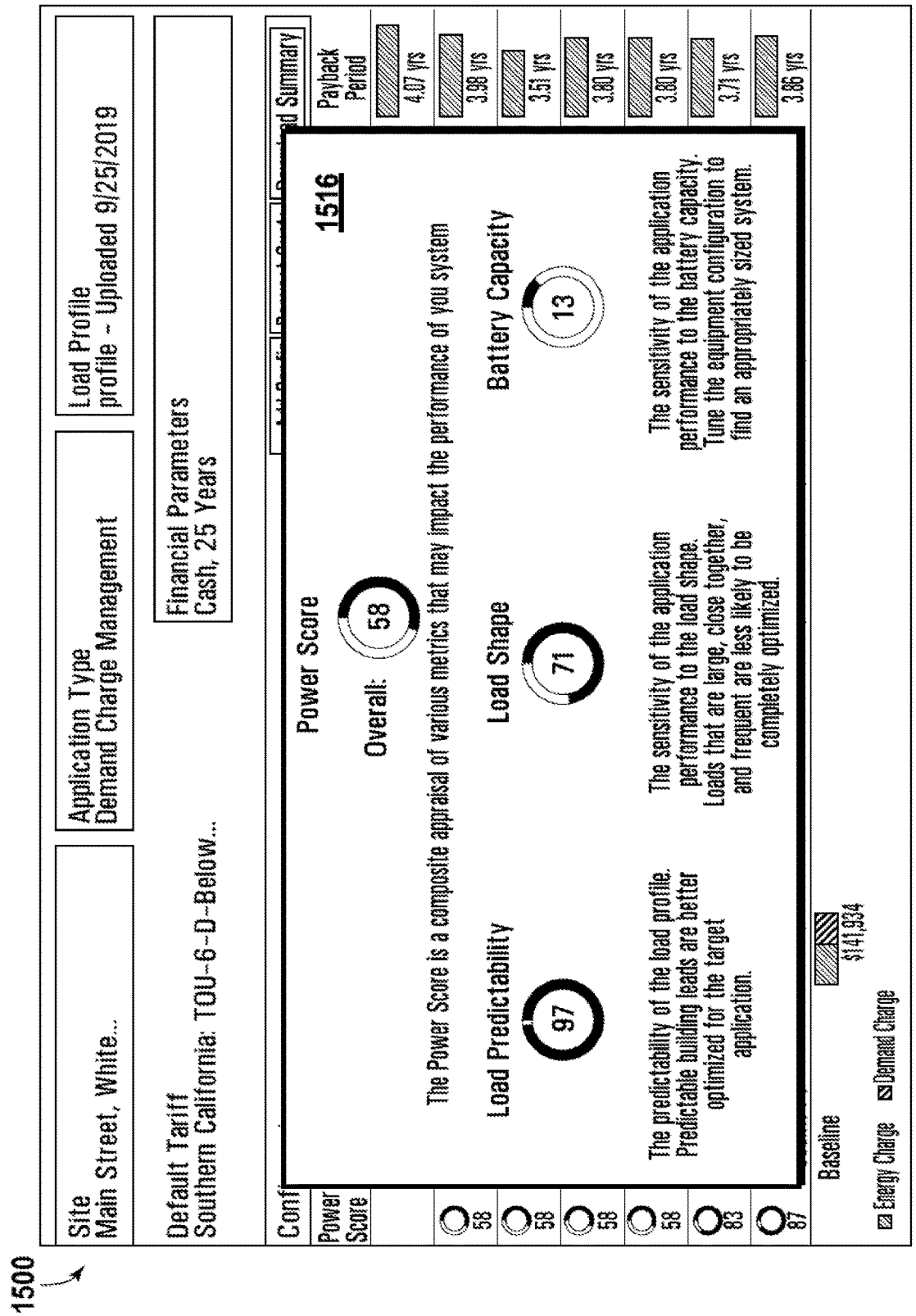

FIG. 15B depicts an embodiment of the user interface page 1500 in which an example window 1516 of a detailed view of a score for one of the sites 22 in the configurations table 1502 is displayed. The confidence score is based on demand-related data, which in FIG. 15B comprises three components: demand predictability (referred to as "load predictability" in FIG. 15B), load shape, and battery capacity, with each of demand predictability, load shape, and battery capacity scored analogously as the overall score. Higher load predictabilities increase the demand predictability score. Loads where any spikes or peaks in demand 90 are large, close together, and/or frequent decrease the load shape score. An example of a "large" demand spike is a spike that is larger than can be accommodated for by battery or photovoltaic capacity. An example of "frequent" demand spikes are spikes the intervals between which are sufficiently small that the batteries cannot be recharged between the spikes, with the cumulative effect of multiple spikes being that the batteries are drained and a demand charge is incurred despite any single spike in and of itself being insufficient to drain the batteries. And the sensitivity of the site 22 to battery capacity increases the battery capacity score. A site 22 where expected peaks in demand that exceed the demand charge threshold can be entirely shaved to below the demand charge threshold by relying on the batteries results in a higher battery capacity score. The confidence score is determined as a linear combination of the demand predictability, load shape, and battery capacity scores.

As discussed above, quantifying demand predictability using the SVR model described in respect of the forecasting module 31 may take an inordinate amount of time, while quantifying demand predictability by presuming future demand will be identical to past demand may be unacceptably inaccurate. In at least some example embodiments, demand predictability is quantified using a class of machine-learning models that are faster than the SVR model "out of the box" (i.e., a set of default hyperparameters may be selected for the model that provide reasonably good accuracy across many different profiles), and that do not exhibit unacceptably large swinging error values between models (e.g., errors exceeding 20% of the value being predicted, and that have a low variance) as a function of its hyperparameters in the vicinity of their theoretically optimal values. One suitable model is the LightGBM ("LGBM") model, which is an example gradient boosting decision tree machine learning model. An example LGBM model is described in Guolin Ke, Qi Meng, Thomas Finley, Taifeng Wang, Wei Chen, Weidone Ma, Qiwei Ye, and Tie-Yan Liu, "LightGBM: A Highly Efficient Gradient Boosting Decision Tree", $31^{st}$ Conference on Neural Information Processing Systems (NIPS 2017), Long Beach, Calif., U.S.A., the entirety of which is hereby incorporated by reference herein. The LGBM model is an ensemble-of-trees machine learning method in which each tree in the ensemble is fit to residuals of another tree from a previous iteration of the model. In at least some example embodiments, a C++ implementation of LGBM that leverages the GPU 2020 for execution and that is released by Microsoft™ Corporation may be used. Other machine learning models may also be used in different example embodiments. For example, gradient boosted and, more particularly, gradient tree boosted machine learning models (e.g., XGBoost) may more generally be used.

Figure 16:
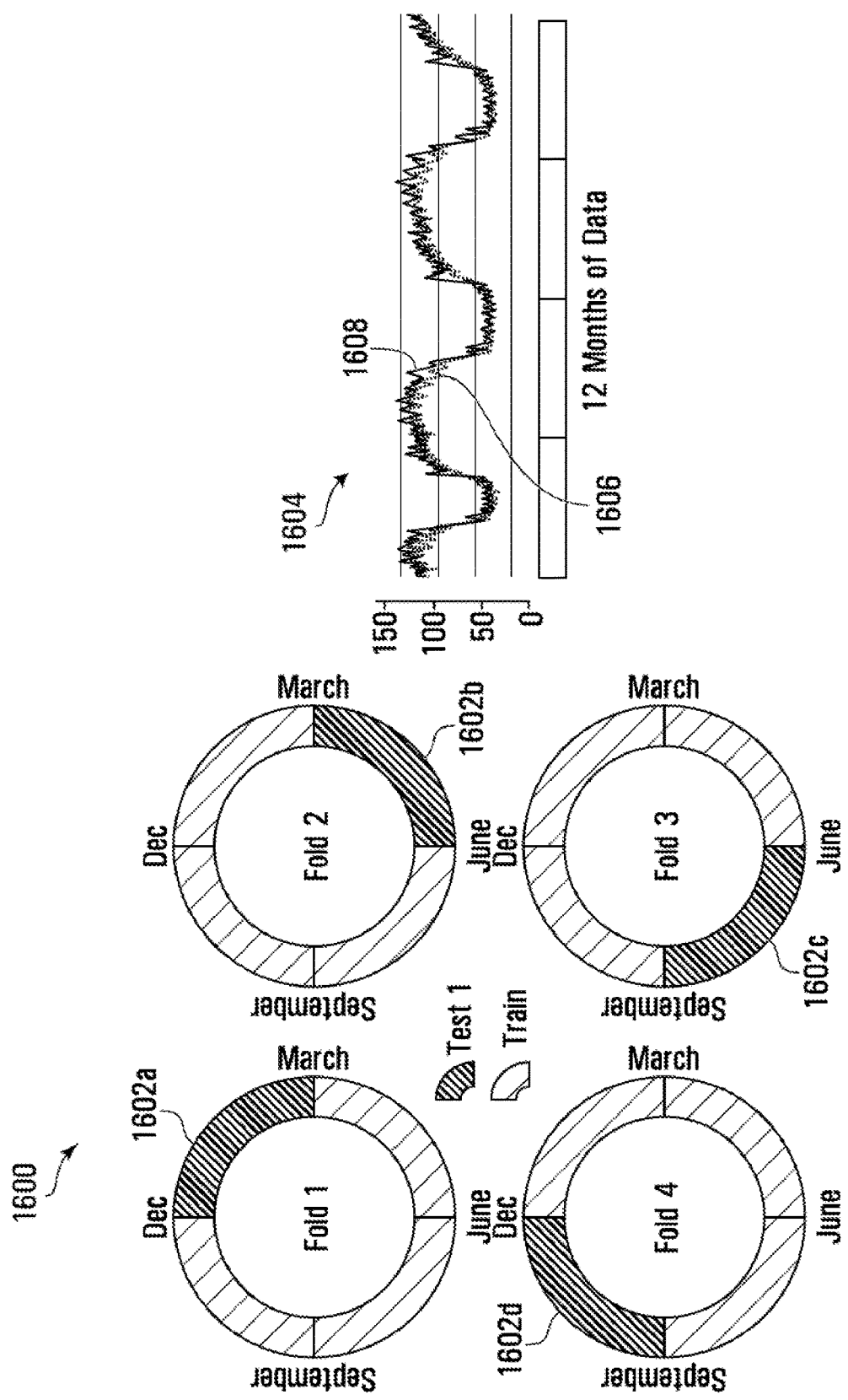
FIG. 16 depicts how historic demand data is used to train a model applied to assess the feasibility of installing a power management system at a site, according to embodiments of the disclosure.

Referring now to FIG. 16, there is depicted how past demand data is used to train the LGBM model using out-of-fold training. FIG. 16 depicts 12 months of past demand data for a site 22 for which a demand prediction is to be generated. The demand data depicted in FIG. 16 is training data used to train the LGBM model. The 12 months of data represents one calendar year of data from January 1st to December $31^{st}$ of a given year. FIG. 16 depicts first through fourth folds of data, with first through fourth seasons 1602a-d respectively corresponding to the first through fourth calendar quarters of the year.

Four LGBM models are trained and tested using the folds. Each fold is three seasons of training data and one season of test data: a first model is trained using the second through fourth seasons 1602b-d, and the first seasons 1602a is then used to test the trained model; a second model is trained using the first, third, and fourth seasons 1602a,c,d, and the second season 1602b is then used to test the trained model; a third model is trained using the first, second, and fourth seasons 1602a,b,d, and the third season 1602c is then used to test the trained model; and a fourth model is trained using the first through third seasons 1602a-c, and the fourth season 1602d is then used to test the trained model. Each of the LGBM models is trained from the same initial state each of the four times. Testing results may be used to generate demand savings estimates, such as those used in populating the energy savings column 1514d. In some embodiments, the seasons 1602a-d may be bootstrapped (i.e., subsampled) and training and testing may be done multiple times in order to reduce uncertainty.

A graph 1604 in FIG. 16 shows demand in kW vs. time-of-year for a first curve 1606 and a second curve 1608. The first curve 1606 shows predicted demand as determined using the four differently trained LGBM models as described above, while the second curve 1608 shows corresponding demand measurements. The test data from the first season 1602a is input to the first trained LGBM model to predict demand data from January to March; the test data from the second season 1602b is input to the second trained LGBM model is predict demand data from March to June; the test data from the third season 1602c is input to the third trained LGBM model to predict demand data from June to September; and the test data from the fourth season 1602d is input to the fourth trained LGBM model to predict demand data from September to December. The graph 1604 accordingly shows that the computer 2006 may generate a forecast for every point in a dataset by picking the corresponding data point from a test fold.

The LGBM model is trained and applied in a manner analogous to the SVR model described above in respect of the forecasting module 31. More particularly, as with the SVR model, one day is divided into 96 tranches of 15 minutes each, and one LGBM model is trained for each of the 96 tranches. The computer 2006 may then generate a demand prediction for any of those 96 tranches by applying the trained LGBM model for that tranche. FIGS. 17A-19B depict example applications of the LGBM model in contrast with the SVR model and the model in which future demand is predicted to match past demand, as described above. FIGS. 17A-18B are generated using data acquired at a first example site 22, and FIGS. 19A and 19B are generated using data acquired at a second example site. In each of FIGS. 17A-19B, the data used to train the LGBM models is bootstrapped, thereby permitting multiple example LGBM predictions to be generated using a single dataset.

In at least some example embodiments, the computer 2006 may use the non-independent nature of prediction error in conjunction with the LGBM models to increase prediction speed. For example, instead of training 96 LGBM models for a particular day as described above, one LGBM model may be trained per hour, and a prediction for a time period for which a trained model does not exist may be interpolated from predictions generated using the trained models for the nearest times on either side of the time period. Interpolating in this way may materially save model training time. For example, if the computer 2006 has available trained models for the time periods corresponding to the $92^{nd}$ and $96^{th}$ tranches and a prediction is required for the $94^{th}$ tranche, the computer 2006 may determine the prediction for the $94^{th}$ time period as an average of the predictions for the $92^{nd}$ and $96^{th}$ tranches, giving equal weight to both tranches. As another example, if the computer 2006 requires a prediction for the $93^{rd}$ tranche, it may determine that prediction as a weighted average of the $92^{nd}$ and $96^{th}$ tranches, giving the $92^{nd}$ tranche a weight of 75% and the $96^{th}$ tranche a weight of 25% if interpolation is performed linearly. In some example embodiments, interpolation may be performed non-linearly and different averaging may be used.

Figure 17A:
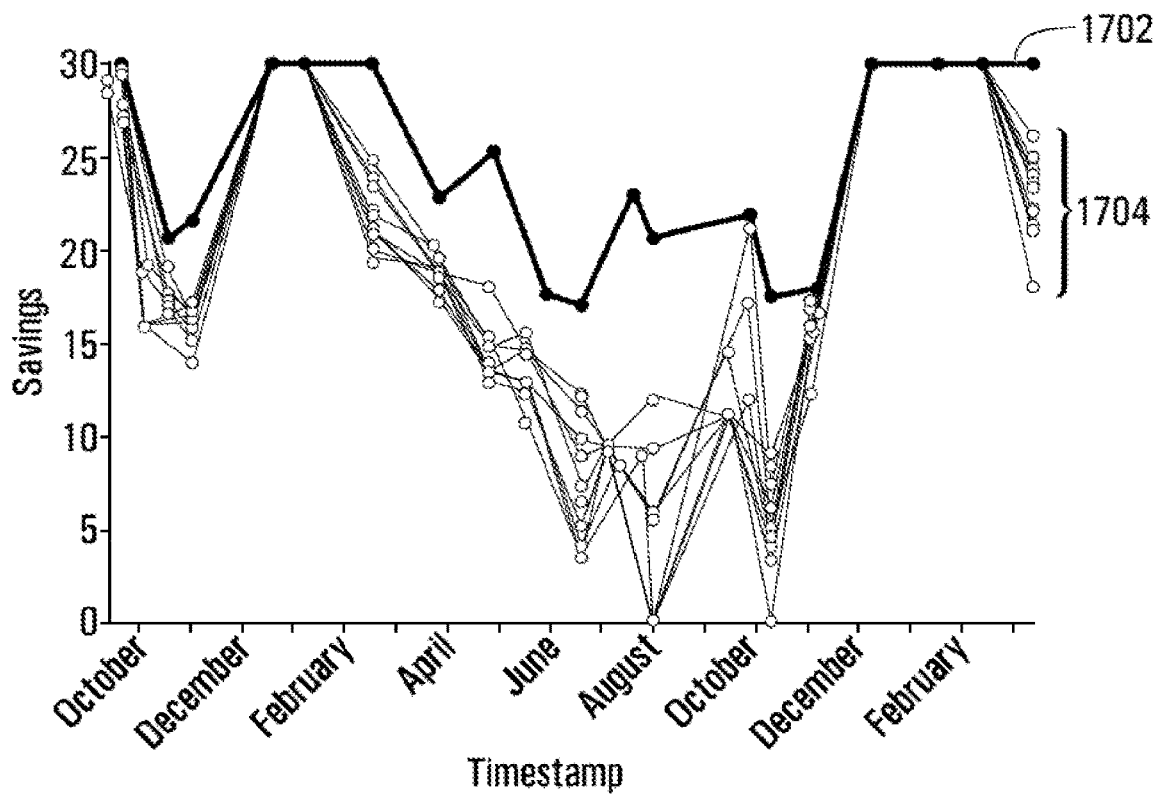
FIGS. 17A, 17B, 18A, 18B, 19A, AND 19B depict example energy savings as predicted by applying a predictive model according to embodiments of the disclosure in contrast to other predictive models.
Figure 17B:
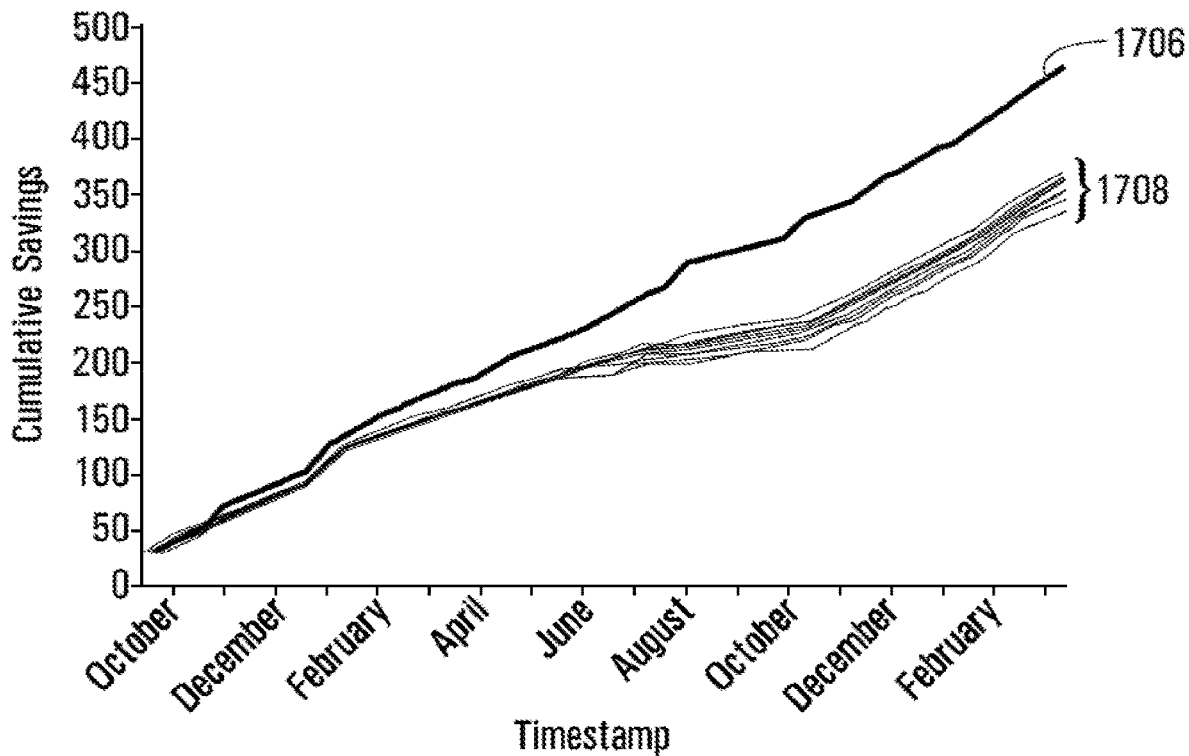
Figure 18A:
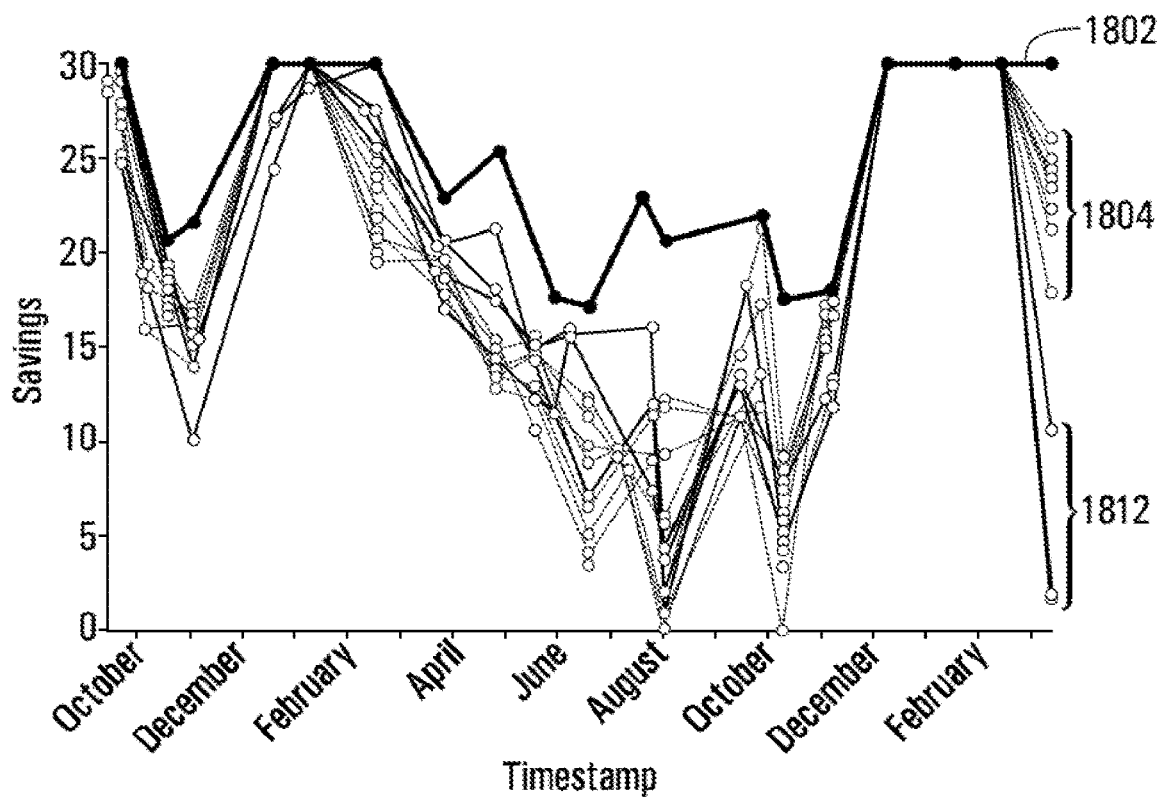
Figure 18B:
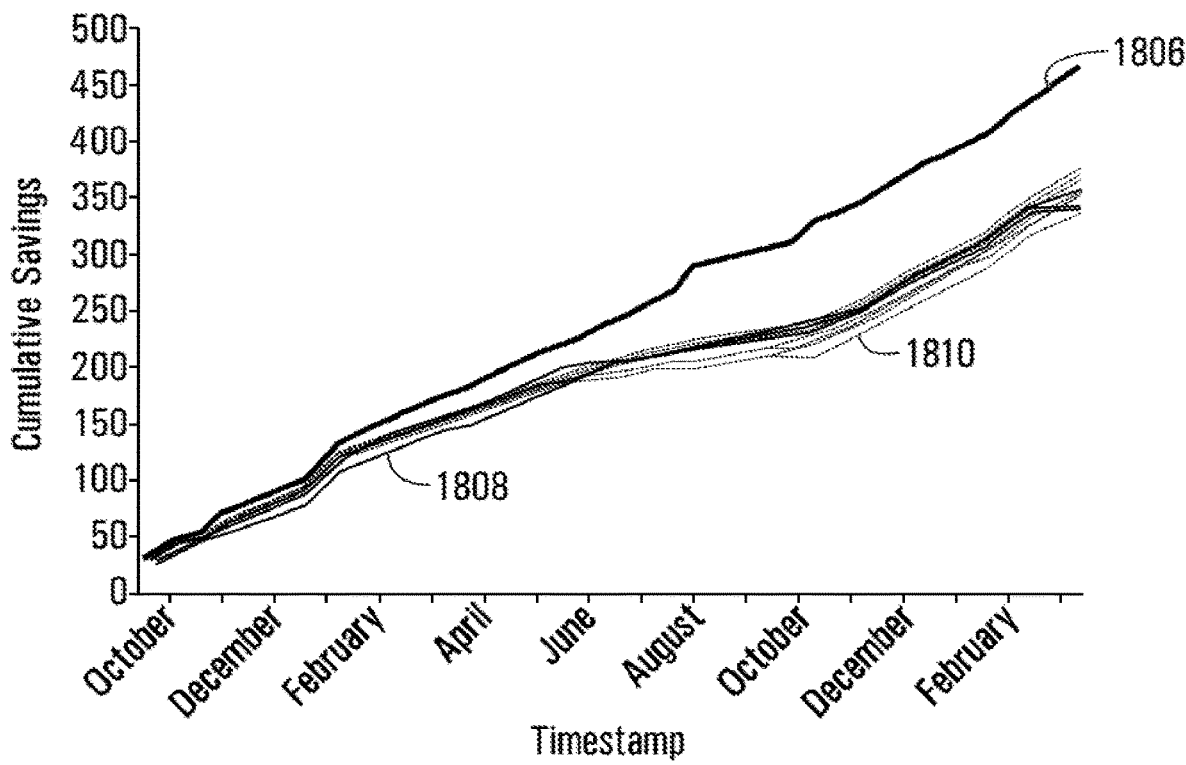
Figure 19A:
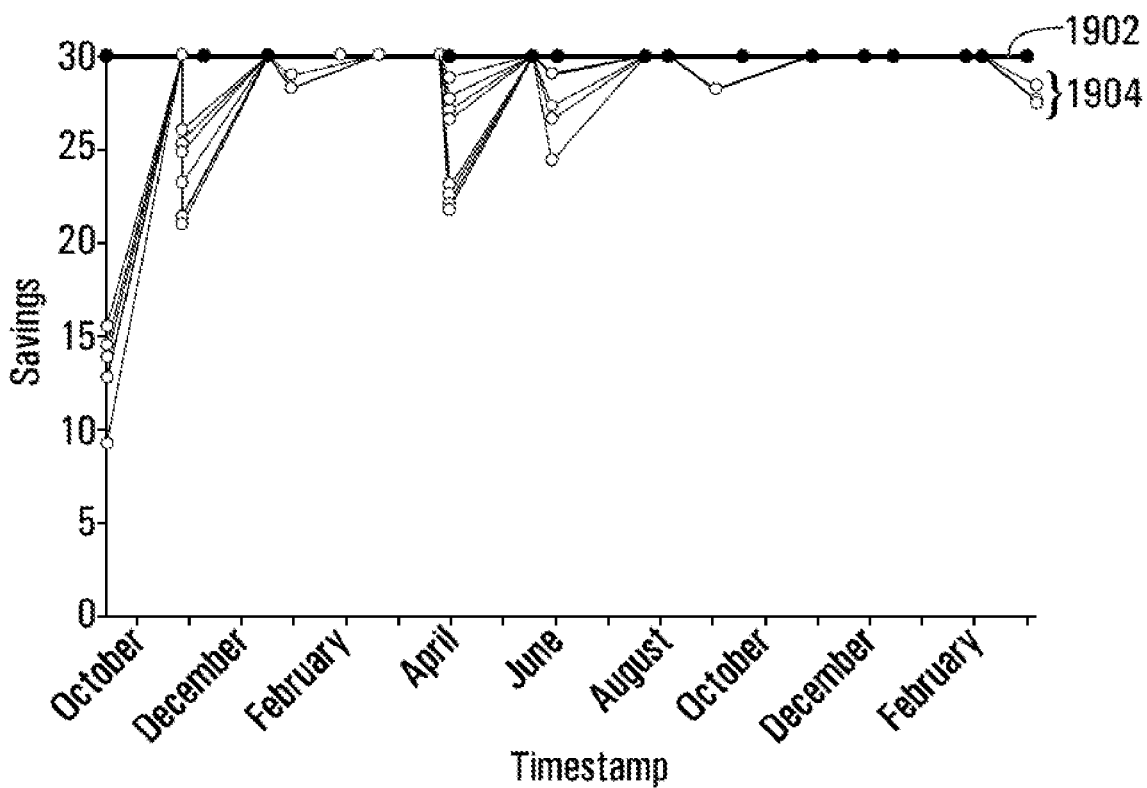
Figure 19B:
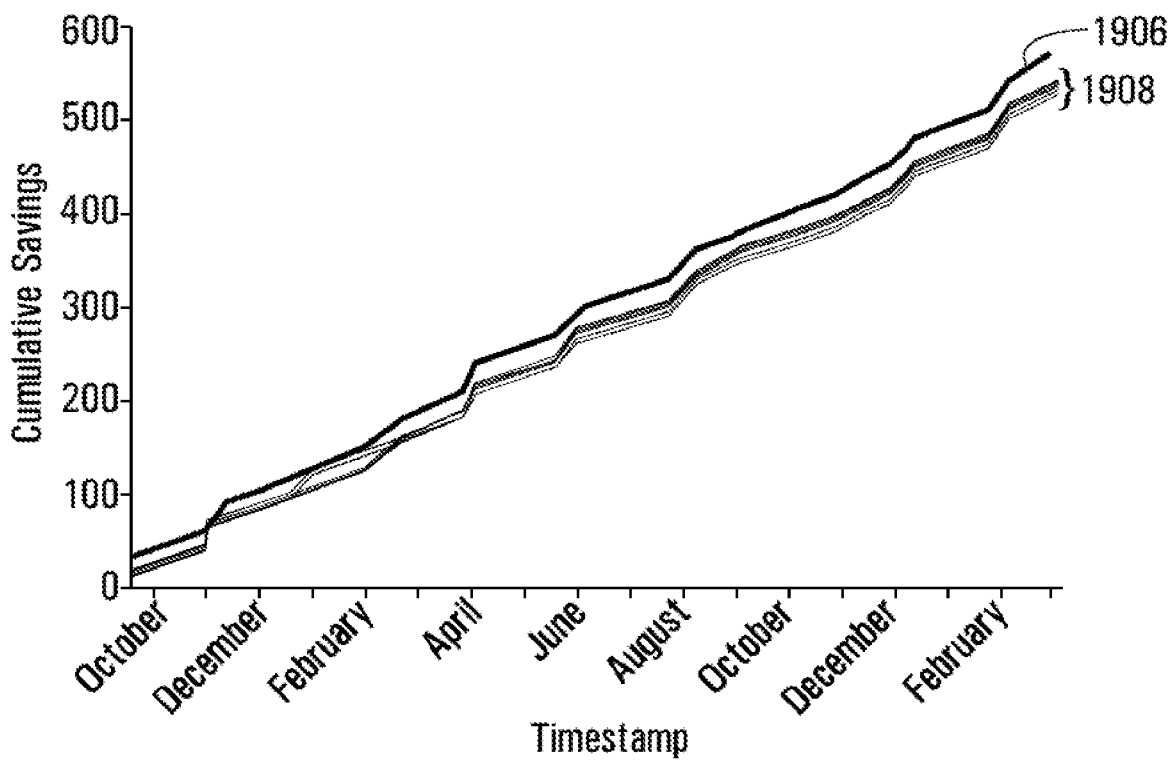

FIGS. 17A and 18A show curves of instantaneous energy savings vs. month for the first example site 22, while FIGS. 17B and 18B show corresponding curves of cumulative energy savings vs. month for that site 22. In FIGS. 17A and 17B, curves 1702 and 1706 respectively show instantaneous and cumulative energy savings based on an ideal model. Curves 1704 and 1708 respectively show instantaneous and cumulative energy savings for a number of demand predictions generated by applying the LGBM model generated by bootstrapping the data. In order to be conservative, a bottom quantile of the variability in savings represented by the curves 1708 in FIG. 17B may be selected for use in determining the expected cost savings that would result from deploying the system 20.

In FIGS. 18A and 18B, curves 1802 and 1806 respectively show instantaneous and cumulative energy savings based on an ideal model, analogous to curves 1702 and 1706 of FIGS. 17A and 17B. Curves 1804 and 1810 respectively show instantaneous and cumulative energy savings for a number of demand predictions generated by applying the LGBM model generated by bootstrapping the data, analogous to curves 1704 and 1708 of FIGS. 17A and 17B. FIGS. 18A and 18B further depict curves 1812 and 1808, which respectively show instantaneous and cumulative energy savings for a number of demand predictions generated by applying an SVR model. FIG. 18B in particular shows the results from the SVR model and the LGBM model are comparable. As with FIGS. 17A and 17B, a bottom quantile of the variability in savings represented by the curves 8708 in FIG. 18B may be selected for use in determining the expected cost savings that would result from deploying the system 20 in order to be conservative.

FIG. 19A shows curves of instantaneous energy savings vs. month for a second example site 22, while FIG. 19B shows corresponding curves of cumulative energy savings vs. month for that site 22. In FIGS. 19A and 19B, curves 1702 and 1706 respectively show instantaneous and cumulative energy savings based on an ideal model. Curves 1704 and 1708 respectively show instantaneous and cumulative energy savings for a number of demand predictions generated by applying the LGBM model generated by bootstrapping the data. The nature of the demand data at the second example site 22 makes prediction easier than the first example site 22, thereby decreasing the difference between the LGBM model's predictions and the ideal model.

Practically, generating predictions by training and applying the LGBM model is materially faster than by training and applying the SVR model. For example, training and applying the SVR model for a year's worth of data broken down into 15 minute tranches may take on the order of hours, while training and applying the LGBM model on the same data may take on the order of a few minutes.

Figure 20:
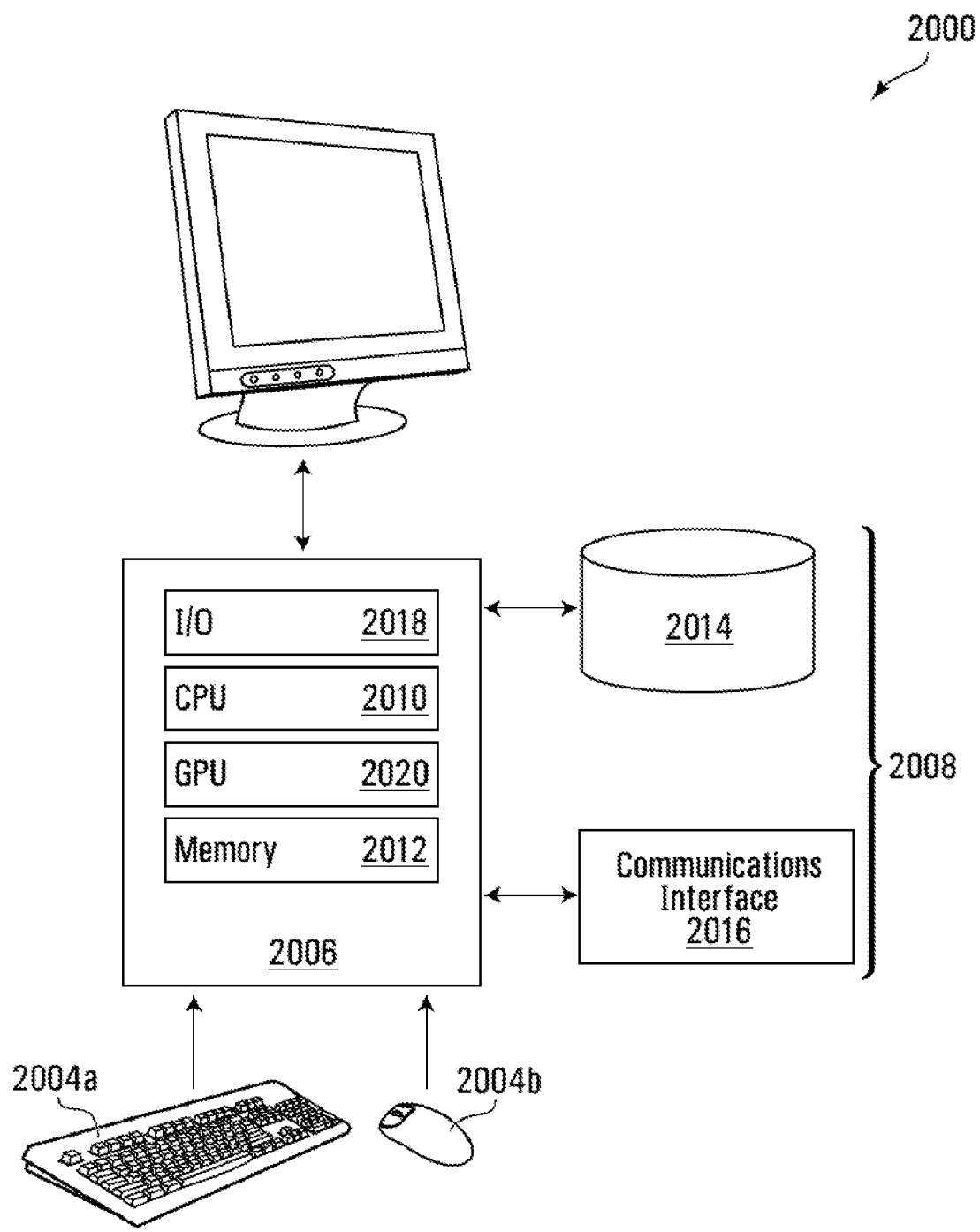
FIG. 20 depicts an example computer system in accordance with another embodiment of the disclosure.

An illustrative computer system 2000 that may be used to train and apply the LGBM model to predict energy demand is presented as a block diagram in FIG. 20. The computer system 2000 comprises a display 2002, input devices in the form of keyboard 2004a and pointing device 2004b, computer 2006, and external devices 2008. While the pointing device 2004b is depicted as a mouse, other types of pointing devices may also be used. In at least some other embodiments, the computer system 2000 may not comprise all the components depicted in FIG. 20. For example, the computer system 2000 may be operated as a server and lack the display 502, keyboard 504a, and mouse 504b.

The computer 2006 may comprise one or more processors or microprocessors, such as a central processing unit (CPU) 2010, which is depicted. The CPU 2010 performs arithmetic calculations and control functions to execute software stored in an internal memory 2012, such as one or both of random access memory (RAM) and read only memory (ROM), and possibly additional storage 2014. The additional storage 2014 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional storage 2014 may be physically internal to the computer 2006, or external as shown in FIG. 20, or both.

The computer system 2000 may also comprise other similar means for allowing computer programs or other instructions to be loaded. Such means can comprise, for example, a communications interface 2016 that allows software and data to be transferred between the computer system 2000 and external systems and networks. Examples of the communications interface 2016 comprise a modem, a network interface such as an Ethernet card, a wireless communication interface, or a serial or parallel communications port. Software and data transferred via the communications interface 2016 are in the form of signals which can be electronic, acoustic, electromagnetic, optical, or other signals capable of being received by the communications interface 2016. Multiple interfaces, of course, can be provided on the computer system 2000.

Input to and output from the computer 2006 is administered by the input/output (I/O) interface 2018. The I/O interface 2018 administers control of the display 2002, keyboard 2004a, external devices 2008 and other analogous components of the computer system 2000. The computer 2006 also comprises a graphical processing unit (GPU) 2020. The GPU 2020 may also be used for computational purposes as an adjunct to, or instead of, the CPU 2010, for mathematical calculations. However, as mentioned above, in alternative embodiments (not depicted) the computer system 2000 need not comprise all of these elements.

The various components of the computer system 2000 are coupled to one another either directly or indirectly by shared coupling to one or more suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit," "module," or "system." Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be utilized. An example non-transitory computer readable medium may comprise, for example, an electronic, magnetic, optical, electromagnetic, infrared, or semiconductor system, apparatus, or device, or any suitable combination thereof. Additional examples of non-transitory computer readable media comprise a portable computer diskette, a hard disk, RAM, ROM, an erasable programmable read-only memory (EPROM or flash memory), a portable compact disc read-only memory (CD-ROM), an optical storage device, a magnetic storage device, or any suitable combination thereof. As used herein, a non-transitory computer readable medium may comprise any tangible medium that can contain, store, or have encoded thereon a program for use by or in connection with an instruction execution system, apparatus, or device. Thus, computer readable program code for implementing aspects of the embodiments described herein may be contained, stored, or encoded on the memory 2012 of the computer 2006, or on a computer readable medium external to the computer 2006, or on any combination thereof; the onboard computer system 2006 or computer 2006 may thereby be configured to perform those embodiments.

Program code embodied on a computer readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object oriented programming language and procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (e.g., through the Internet using an Internet Service Provider).

While the disclosure has been described in connection with specific embodiments, it is to be understood that the disclosure is not limited to these embodiments, and that alterations, modifications, and variations of these embodiments may be carried out by the skilled person without departing from the scope of the disclosure. For example, it is contemplated that the electricity management system may be configured to control the energy demand of individual energy-demanding devices at the site, so as to better manage the energy demand curve. It is furthermore contemplated that any part of any aspect or embodiment discussed in this specification can be implemented or combined with any part of any other aspect or embodiment discussed in this specification.

The invention claimed is:

1. A method comprising:
    (a) obtaining, using a processor:
        (i) predicted demand charge savings resulting from deployment of an energy management system at a site; and
        (ii) demand-related data describing at least two of load predictability, load shape, and battery capacity of the energy management system;
    (b) determining, using the processor and based on the predicated demand charge savings and the demand-related data, a confidence score representing a confidence that the predicted demand charge savings will result in view of the demand-related data; and
    (c) displaying, using the processor, the confidence score on a display.

2. The method of claim 1, wherein the confidence score is determined as a linear combination of the at least two of load predictability, load shape, and battery capacity of an energy management system.

3. The method of claim 1, wherein obtaining the predicted demand charge savings comprising predicting electricity demand for the site, wherein predicting the electricity demand comprises applying a machine learning method.

4. The method of claim 3, wherein the machine learning method comprises a gradient boosted machine learning method.

5. The method of claim 4, wherein the gradient boosted machine learning method comprises a gradient tree boosted machine learning method.

6. The method of claim 5, wherein the gradient tree boosted machine learning method comprises a light gradient boosted method.

7. The method of claim 1, wherein the energy management system applies support vector regression to predict demand.

8. The method of claim 3, wherein applying the machine learning method comprises:
    (a) estimating, using the machine learning method, demand for a first period of time and a second period of time; and
    (b) interpolating demand for a third period of time that is between the first and second periods of time from the demand for the first period of time and the demand for a second period of time.

9. The method of claim 8, wherein the interpolating the demand for the third period of time comprises determining a weighted average of the demand for the first period of time and the demand for the second period of time, wherein weights for the weighted average are based on proximity of the third period of time to the first and second periods of time.

10. The method of claim 1, wherein the demand-related data further describes at least one of weather affecting the site, photovoltaic cell capacity of the energy management system, electricity tariffs affecting the site, and application of electricity at the site.

11. A system comprising:
    (a) a processor;
    (b) a display communicatively coupled to the processor;
    (c) a memory communicatively coupled to the processor and having stored thereon computer program that is executable by a processor and that, when executed by the processor, causes the processor to perform a method comprising:
        (i) obtaining, using the processor:
            (A) predicted demand charge savings resulting from deployment of an energy management system at a site; and
            (B) demand-related data describing at least two of load predictability, load shape, and battery capacity of the energy management system;
        (ii) determining, using the processor and based on the predicated demand charge savings and the demand-related data, a confidence score representing a confidence that the predicted demand charge savings will result in view of the demand-related data; and
        (iii) displaying, using the processor, the confidence score on the display.

12. The method of claim 1, wherein the confidence score is determined as a linear combination of the at least two of load predictability, load shape, and battery capacity of an energy management system.

13. The method of claim 11, wherein obtaining the predicted demand charge savings comprising predicting electricity demand for the site, wherein predicting the electricity demand comprises applying a machine learning method.

14. The method of claim 13, wherein the machine learning method comprises a gradient boosted machine learning method.

15. The method of claim 14, wherein the gradient boosted machine learning method comprises a gradient tree boosted machine learning method.

16. The method of claim 15, wherein the gradient tree boosted machine learning method comprises a light gradient boosted method.

17. The method of claim 11, wherein the energy management system applies support vector regression to predict demand.

18. The method of claim 13, wherein applying the machine learning method comprises:
   (a) estimating, using the machine learning method, demand for a first period of time and a second period of time; and
   (b) interpolating demand for a third period of time that is between the first and second periods of time from the demand for the first period of time and the demand for a second period of time.

19. The method of claim 18, wherein the interpolating the demand for the third period of time comprises determining a weighted average of the demand for the first period of time and the demand for the second period of time, wherein weights for the weighted average are based on proximity of the third period of time to the first and second periods of time.

20. The method of claim 11, wherein the demand-related data further describes at least one of weather affecting the site, photovoltaic cell capacity of the energy management system, electricity tariffs affecting the site, and application of electricity at the site.

21. A non-transitory computer readable medium having stored thereon computer program that is executable by a processor and that, when executed by the processor, causes the processor to perform a method comprising:
   (a) obtaining, using a processor:
      (i) predicted demand charge savings resulting from deployment of an energy management system at a site; and
      (ii) demand-related data describing at least two of load predictability, load shape, and battery capacity of the energy management system;
   (b) determining, using the processor and based on the predicated demand charge savings and the demand-related data, a confidence score representing a confidence that the predicted demand charge savings will result in view of the demand-related data; and
   (c) displaying, using the processor, the confidence score on a display.

* * * * *